(12) United States Patent
Liu et al.

(10) Patent No.: US 12,550,144 B2
(45) Date of Patent: Feb. 10, 2026

(54) SIDELINK OUT OF CHANNEL OCCUPANCY TIME RESERVATION

(71) Applicant: QUALCOMM Incorporated, San Diego, CA (US)

(72) Inventors: Chih-Hao Liu, San Diego, CA (US); Peter Gaal, San Diego, CA (US); Jing Sun, San Diego, CA (US); Yisheng Xue, San Diego, CA (US); Xiaoxia Zhang, San Diego, CA (US); Giovanni Chisci, San Diego, CA (US)

(*) Notice: Subject to any disclaimer, the term of this patent is extended or adjusted under 35 U.S.C. 154(b) by 734 days.

(21) Appl. No.: 17/804,208

(22) Filed: May 26, 2022

(65) Prior Publication Data

US 2023/0389021 A1 Nov. 30, 2023

(51) Int. Cl.
*H04W 72/20* (2023.01)
*H04W 28/26* (2009.01)
*H04W 72/121* (2023.01)
*H04W 72/566* (2023.01)
*H04W 74/0808* (2024.01)
*H04W 92/18* (2009.01)

(52) U.S. Cl.
CPC ........ *H04W 72/20* (2023.01); *H04W 28/26* (2013.01); *H04W 72/121* (2013.01); *H04W 72/566* (2023.01); *H04W 74/0808* (2013.01); *H04W 92/18* (2013.01)

(58) Field of Classification Search
CPC ... H04W 72/20; H04W 72/566; H04W 28/26; H04W 72/121; H04W 74/0808; H04W 92/18; H04W 72/25; H04W 72/27; H04W 72/29; H04W 8/20; H04W 36/0072; H04W 72/56; H04W 72/04; H04W 4/08; H04W 74/0816; H04W 74/0825; H04W 76/14; H04W 76/23
See application file for complete search history.

(56) References Cited

U.S. PATENT DOCUMENTS

| | | | | |
|---|---|---|---|---|
| 2018/0139781 | A1* | 5/2018 | Park | H04W 72/23 |
| 2020/0170039 | A1* | 5/2020 | Jiang | H04W 16/14 |
| 2021/0014892 | A1* | 1/2021 | Xue | H04L 27/0006 |
| 2021/0068153 | A1* | 3/2021 | Seo | H04W 4/40 |
| 2021/0092783 | A1* | 3/2021 | Sun | H04W 76/15 |

(Continued)

FOREIGN PATENT DOCUMENTS

| | | |
|---|---|---|
| WO | WO-2021208031 A1 | 10/2021 |
| WO | WO-2021212254 A1 | 10/2021 |
| WO | WO-2021226906 A1 | 11/2021 |

OTHER PUBLICATIONS

International Search Report and Written Opinion—PCT/US2023/020454—ISA/EPO—Jul. 18, 2023.

*Primary Examiner* — Brian T Le

(57) ABSTRACT

In some aspects, a user equipment (UE) may receive, via a sidelink communication, an indication that another UE has reserved a first channel occupancy time (COT) resource of a plurality of COT resources. The UE may reserve a second COT resource of the plurality of COT resources via one or more slots associated with the first COT resource and using frequency division multiplexing (FDM) channel access, or transmit a communication, via the one or more slots associated with the first COT resource, using a different interlace than an interlace that is associated with the first COT resource. Numerous other aspects are described.

30 Claims, 13 Drawing Sheets

(56) References Cited

U.S. PATENT DOCUMENTS

| | | | |
|---|---|---|---|
| 2021/0297223 A1* | 9/2021 | Yang | H04L 1/1854 |
| 2021/0400732 A1 | 12/2021 | Xue et al. | |
| 2022/0078845 A1* | 3/2022 | Xu | H04W 72/0446 |
| 2022/0399964 A1* | 12/2022 | Bhattad | H04L 1/1887 |
| 2023/0164833 A1* | 5/2023 | Kusashima | H04W 16/14 |
| | | | 370/329 |
| 2023/0283431 A1* | 9/2023 | Nunome | H04W 74/08 |
| | | | 370/336 |
| 2024/0155678 A1* | 5/2024 | Liu | H04W 16/14 |
| 2024/0163962 A1* | 5/2024 | Freda | H04W 76/23 |

\* cited by examiner

SIDELINK OUT OF CHANNEL OCCUPANCY TIME RESERVATION

FIELD OF THE DISCLOSURE

Aspects of the present disclosure generally relate to wireless communication and to techniques and apparatuses for sidelink out of channel occupancy time reservation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, via a sidelink communication, an indication that another UE has reserved a first channel occupancy time (COT) resource of a plurality of COT resources. The method may include reserving a second COT resource of the plurality of COT resources via one or more slots associated with the first COT resource and using frequency division multiplexing (FDM) channel access, or transmitting a communication, via the one or more slots associated with the first COT resource, using a different interlace than an interlace that is associated with the first COT resource.

Some aspects described herein relate to a method of wireless communication performed by a UE. The method may include reserving a first COT resource of a plurality of COT resources during a time period that is outside of the COT resource. The method may include receiving, via a sidelink communication, an indication that another UE has reserved a second COT resource of the plurality of COT resources via one or more slots associated with the first COT resource and using FDM channel access, or that the other UE has transmitted a communication, via the one or more slots associated with the first COT resource, using a different interlace than an interlace that is associated with the first COT resource. The method may include performing a communication using the first COT resource and based at least in part on avoiding the second COT resource or the different interlace.

Some aspects described herein relate to an apparatus for wireless communication performed by a UE. The apparatus may include a memory and one or more processors, coupled to the memory. The one or more processors may be configured to receive, via a sidelink communication, an indication that another UE has reserved a first COT resource of a plurality of COT resources. The one or more processors may be configured to reserve a second COT resource of the plurality of COT resources via one or more slots associated with the first COT resource and using FDM channel access, or transmit a communication, via the one or more slots associated with the first COT resource, using a different interlace than an interlace that is associated with the first COT resource.

Some aspects described herein relate to an apparatus for wireless communication performed by a UE. The apparatus may include a memory and one or more processors, coupled to the memory. The one or more processors may be configured to reserve a first COT resource of a plurality of COT resources during a time period that is outside of the COT resource. The one or more processors may be configured to receive, via a sidelink communication, an indication that another UE has reserved a second COT resource of the plurality of COT resources via one or more slots associated with the first COT resource and using FDM channel access, or that the other UE has transmitted a communication, via the one or more slots associated with the first COT resource, using a different interlace than an interlace that is associated with the first COT resource. The one or more processors may be configured to perform a communication using the first COT resource and based at least in part on avoiding the second COT resource or the different interlace.

Some aspects described herein relate to a non-transitory computer-readable medium that stores a set of instructions for wireless communication by a UE. The set of instructions, when executed by one or more processors of the UE, may cause the UE to receive, via a sidelink communication, an indication that another UE has reserved a first COT resource of a plurality of COT resources. The set of instructions, when executed by one or more processors of the UE, may cause the UE to reserve a second COT resource of the plurality of COT resources via one or more slots associated with the first COT resource and using FDM channel access, or transmit a communication, via the one or more slots associated with the first COT resource, using a different interlace than an interlace that is associated with the first COT resource.

Some aspects described herein relate to a non-transitory computer-readable medium that stores a set of instructions for wireless communication by a UE. The set of instructions, when executed by one or more processors of the UE, may cause the UE to reserve a first COT resource of a plurality of COT resources during a time period that is outside of the COT resource. The set of instructions, when executed by one or more processors of the UE, may cause the UE to receive, via a sidelink communication, an indication that another UE has reserved a second COT resource of the plurality of COT resources via one or more slots associated with the first COT resource and using FDM channel access, or that the other UE has transmitted a communication, via the one or more slots associated with the first COT resource, using a different interlace than an interlace that is associated with the first COT resource. The set of instructions, when executed by one or more processors of the UE, may cause the UE to perform a communication using the first COT resource and based at least in part on avoiding the second COT resource or the different interlace.

Some aspects described herein relate to an apparatus for wireless communication. The apparatus may include means for receiving, via a sidelink communication, an indication that another UE has reserved a first COT resource of a plurality of COT resources. The apparatus may include means for reserving a second COT resource of the plurality of COT resources via one or more slots associated with the first COT resource and using FDM channel access, or transmitting a communication, via the one or more slots associated with the first COT resource, using a different interlace than an interlace that is associated with the first COT resource.

Some aspects described herein relate to an apparatus for wireless communication. The apparatus may include means for reserving a first COT resource of a plurality of COT resources during a time period that is outside of the COT resource. The apparatus may include means for receiving, via a sidelink communication, an indication that another UE has reserved a second COT resource of the plurality of COT resources via one or more slots associated with the first COT resource and using FDM channel access, or that the other UE has transmitted a communication, via the one or more slots associated with the first COT resource, using a different interlace than an interlace that is associated with the first COT resource. The apparatus may include means for performing a communication using the first COT resource and based at least in part on avoiding the second COT resource or the different interlace.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims. While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
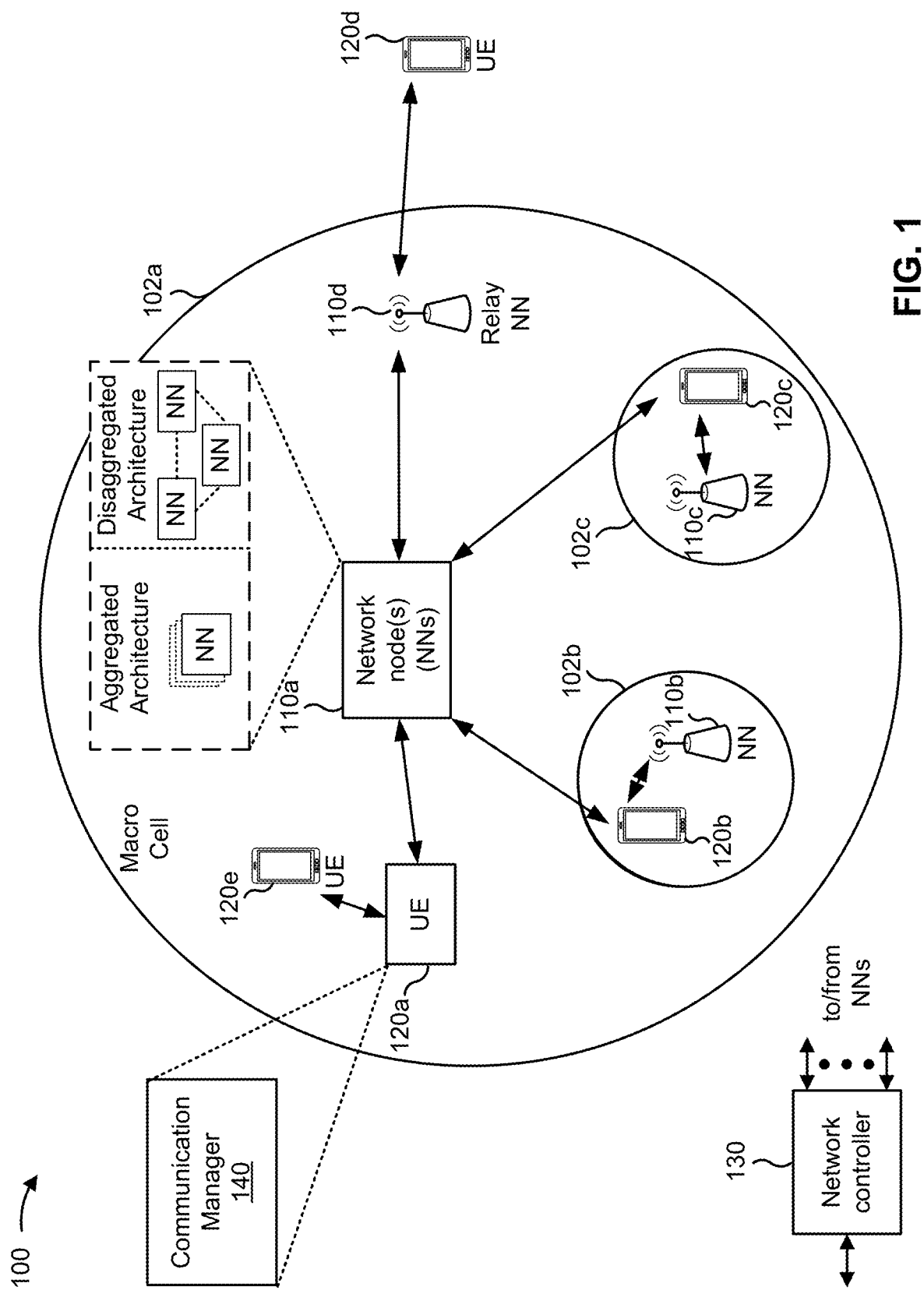
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LIE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, via a sidelink communication, an indication that another UE has reserved a first channel occupancy time (COT) resource of a plurality of COT resources; and reserve a second COT resource of the plurality of COT resources via one or more slots associated with the first COT resource and using frequency division multiplexing (FDM) channel access, or transmit a communication, via the one or more slots associated with the first COT resource, using a different interlace than an interlace that is associated with the first COT resource. Additionally, or alternatively, the communication manager 140 may perform one or more other operations described herein.

In some aspects, the communication manager 140 may reserve a first COT resource of a plurality of COT resources during a time period that is outside of the COT resource; receive, via a sidelink communication, an indication that another UE has reserved a second COT resource of the plurality of COT resources via one or more slots associated with the first COT resource and using FDM channel access, or that the other UE has transmitted a communication, via the one or more slots associated with the first COT resource, using a different interlace than an interlace that is associated with the first COT resource; and perform a communication using the first COT resource and based at least in part on avoiding the second COT resource or the different interlace. Additionally, or alternatively, the communication manager 140 may perform one or more other operations described herein.

As indicated above, FIG. 1 is provided as an example. Other examples may differ from what is described with regard to FIG. 1.

Figure 2:
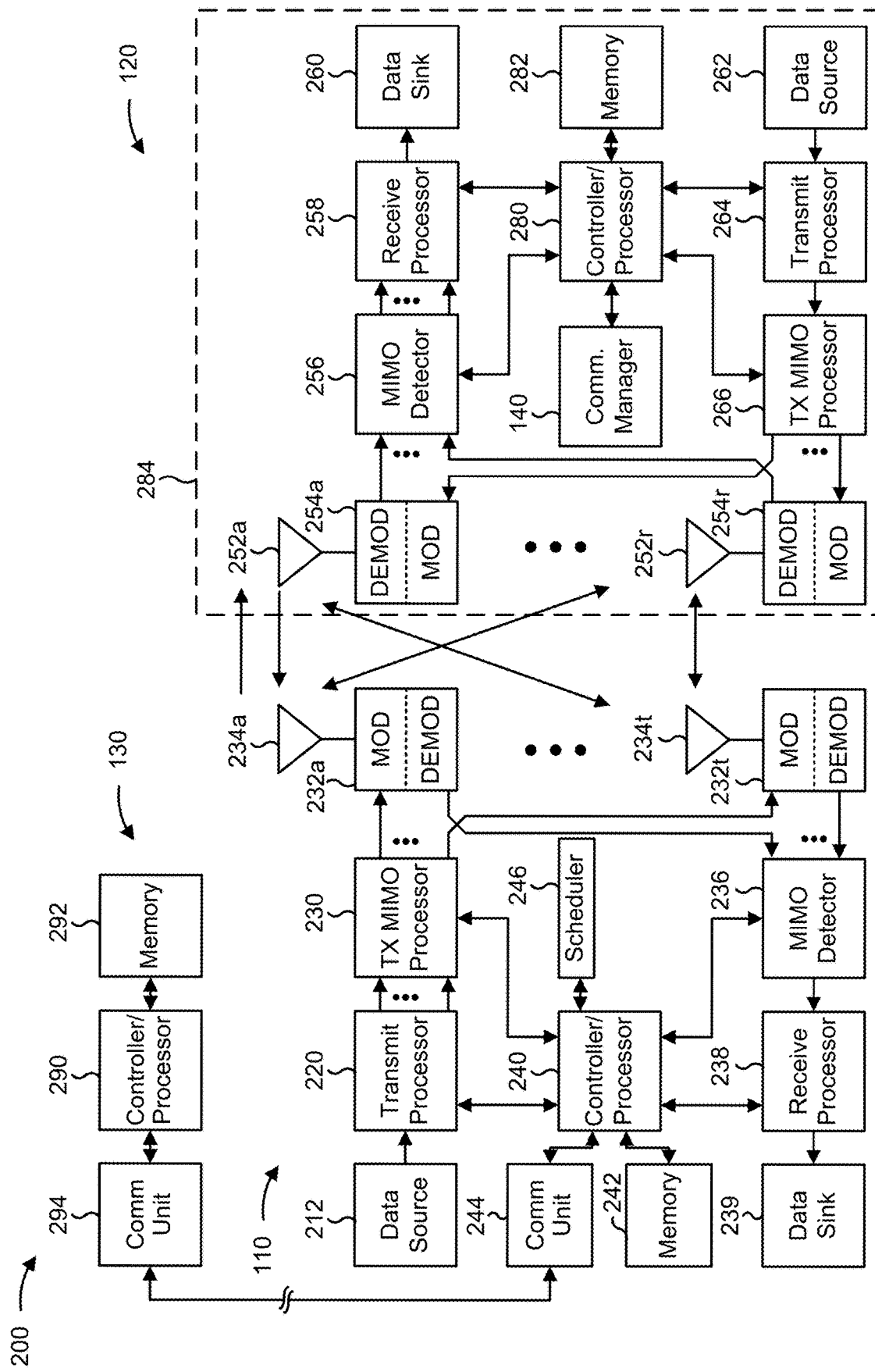
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

The controller/processor 240 of the network node 110, the controller/processor 280 of the UE 120, and/or any other component(s) of FIG. 2 may perform one or more techniques associated with sidelink out-of-COT reservation, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving, via a sidelink communication, an indication that another UE has reserved a first COT resource of a plurality of COT resources; and/or means for reserving a second COT resource of the plurality of COT resources via one or more slots associated with the first COT resource and using FDM channel access, or transmitting a communication, via the one or more slots associated with the first COT resource, using a different interlace than an interlace that is associated with the first COT resource. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., the UE 120) includes means for reserving a first COT resource of a plurality of COT resources during a time period that is outside of the COT resource; means for receiving, via a sidelink communication, an indication that another UE has reserved a second COT resource of the plurality of COT resources via one or more slots associated with the first COT resource and using FDM channel access, or that the other UE has transmitted a communication, via the one or more slots associated with the first COT resource, using a different interlace than an interlace that is associated with the first COT resource; and/or means for performing a communication using the first COT resource and based at least in part on avoiding the second COT resource or the different interlace. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
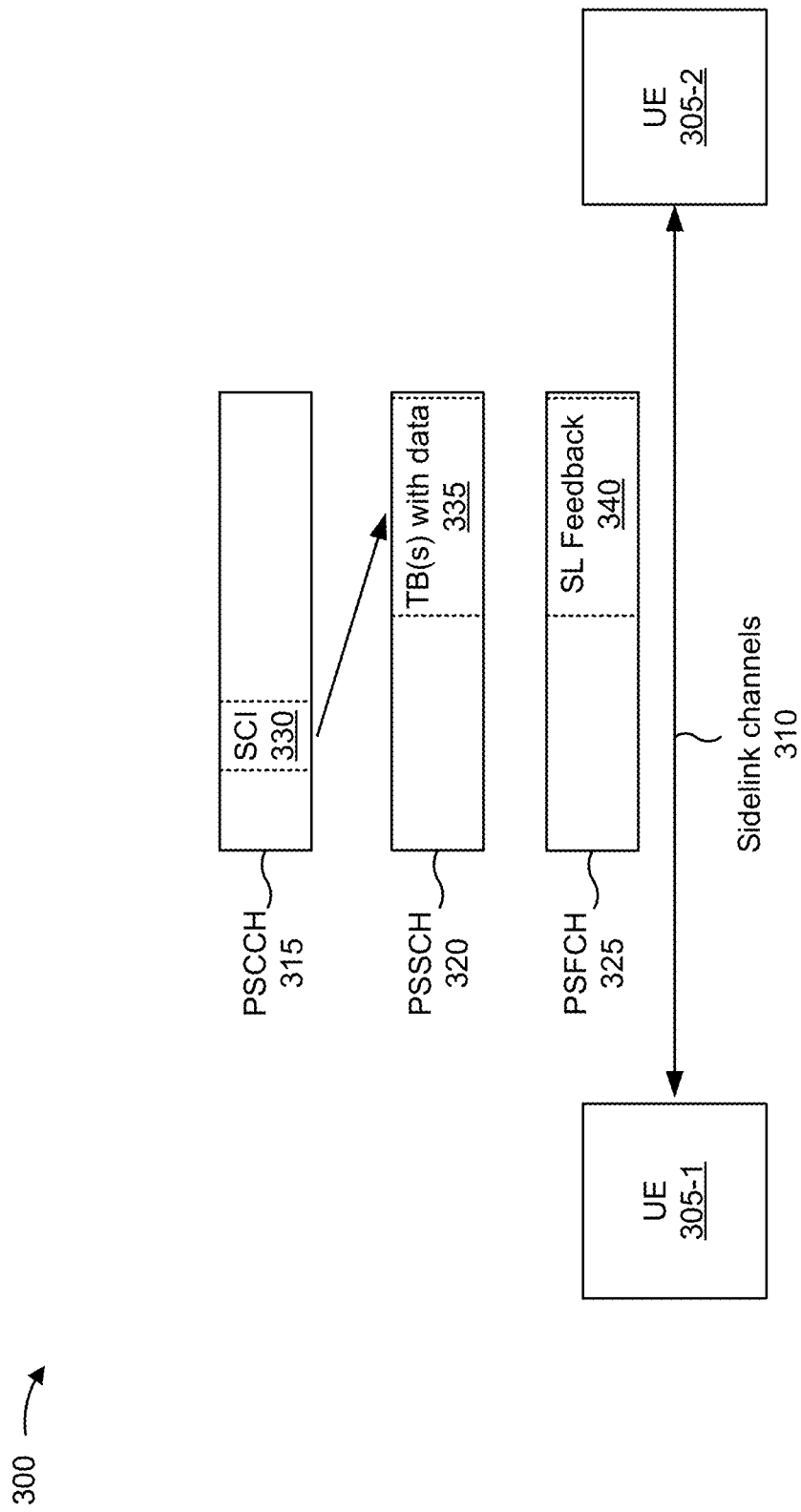
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in subchannels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a network node 110. For example, the UE 305 may receive a grant (e.g., in downlink control information (DCI) or in a radio resource control (RRC) message, such as for configured grants) from the network node 110 for sidelink channel access and/or scheduling. In some aspects, a UE 305 may operate using a transmission mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
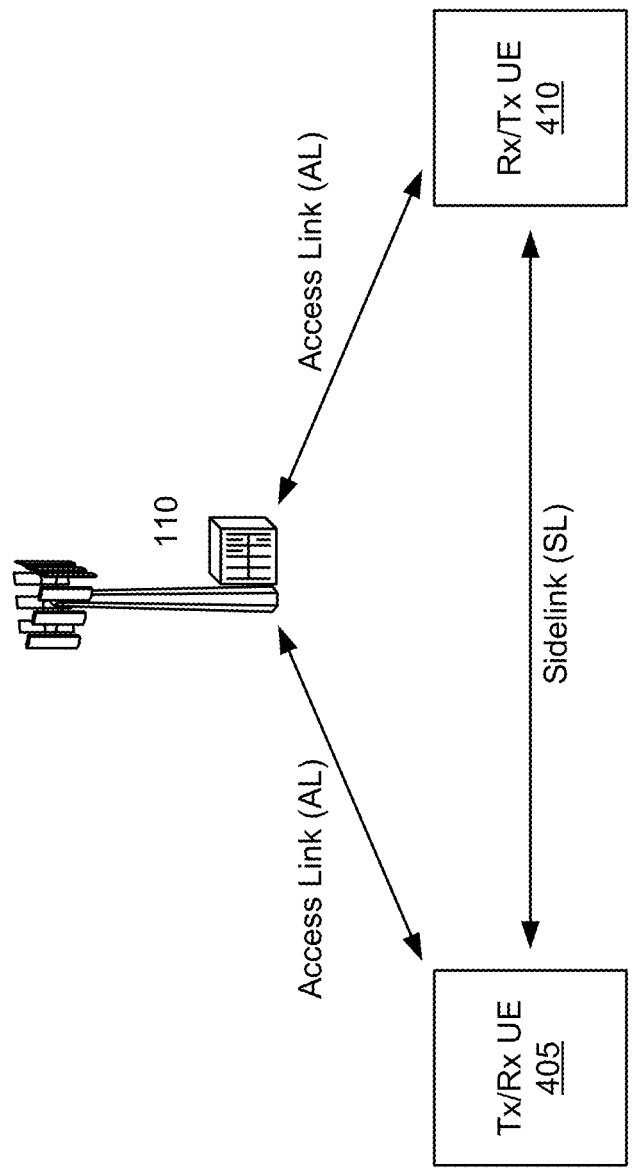
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a network node 110 may communicate with the Tx/Rx UE 405 via a first access link. Additionally, or alternatively, in some sidelink modes, the network node 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a network node 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 4 is provided as an example. Other examples may differ from what is described with respect to FIG. 4.

Figure 5A:
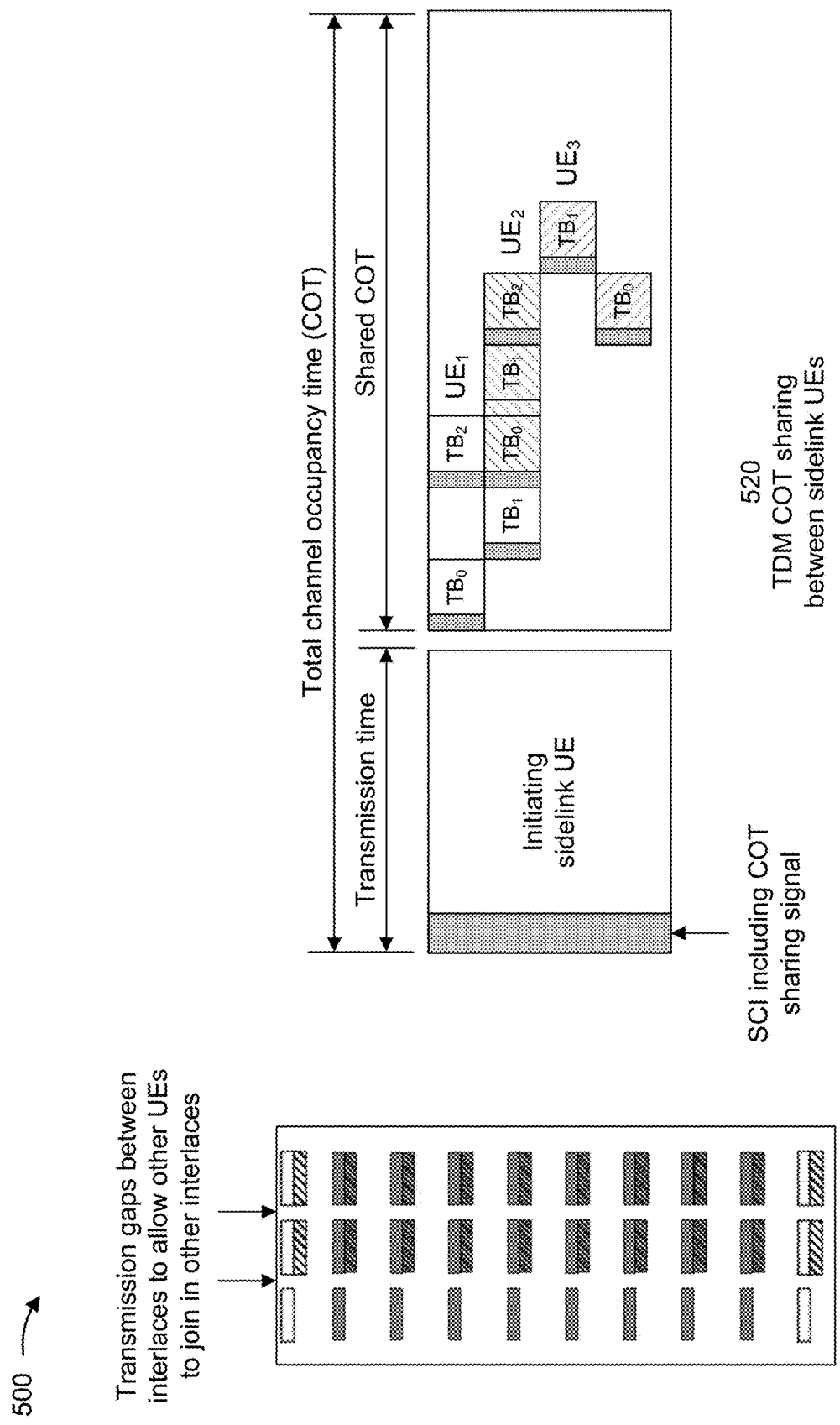
FIGS. 5A-5B are diagrams illustrating examples of channel occupancy time (COT) sharing for sidelink communication in an unlicensed spectrum, in accordance with the present disclosure.
Figure 5B:
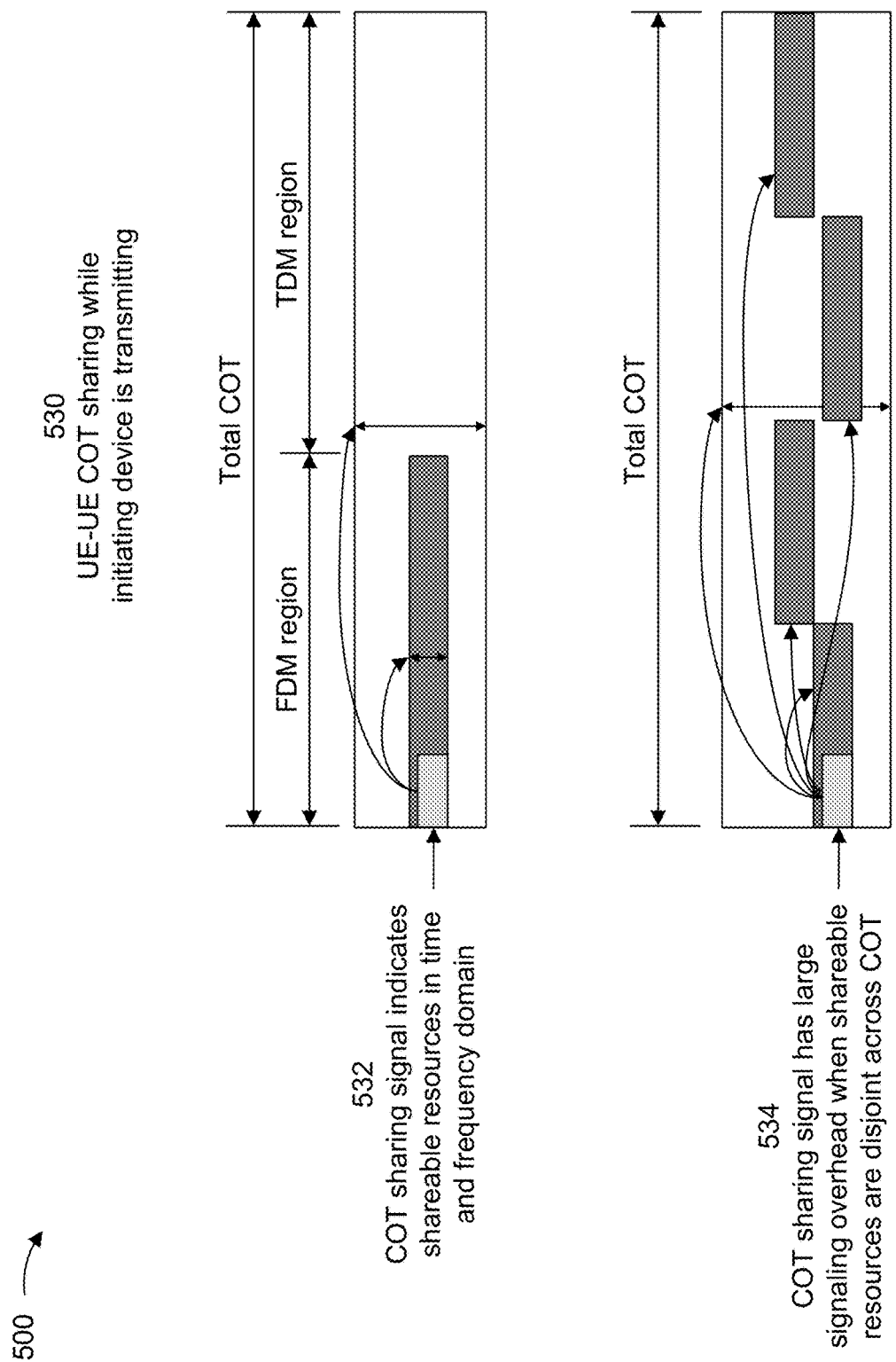

FIGS. 5A-5B are diagrams illustrating examples 500 of COT sharing for sidelink communication in an unlicensed spectrum, in accordance with various aspects of the present disclosure.

For example, to accommodate increasing traffic demands, there have been various efforts to improve spectral efficiency in wireless networks and thereby increase network capacity (e.g., via use of higher order modulations, advanced MIMO antenna technologies, and/or multi-cell coordination techniques, among other examples). Another way to potentially improve network capacity is to expand system bandwidth. However, available spectrum in lower frequency bands that have traditionally been licensed or otherwise allocated to mobile network operators has become very scarce. Accordingly, various technologies have been developed to enable operation of a cellular radio access technology (RAT) in unlicensed or other shared spectrum. For example, Licensed-Assisted Access (LAA) uses carrier aggregation on a downlink to combine LTE in a licensed frequency band with LTE in an unlicensed frequency band (e.g., the 2.4 and/or 5 GHz bands already populated by wireless local area network (WLAN) or "Wi-Fi" devices). In other examples, Enhanced LAA (eLAA) and Further Enhanced LAA (feLAA) technologies enable both uplink and downlink LTE operation in unlicensed spectrum, MulteFire is an LTE-based technology that operates in unlicensed and shared spectrum in a standalone mode, NR-U enables NR operation in unlicensed spectrum, and/or the like. In general, when operating a cellular RAT in unlicensed spectrum (e.g., using LAA, eLAA, feLAA, MulteFire, and/or NR-U), one challenge that arises is the need to ensure fair coexistence with incumbent (e.g., WLAN) systems that may be operating in the unlicensed spectrum.

For example, prior to gaining access to and/or transmitting over an unlicensed channel, a transmitting device (e.g., network node 110, UE 120, UE 305, and/or the like) that has a packet to transmit may need to perform a listen-before-talk (LBT) procedure to contend for access to the unlicensed channel. The LBT procedure may generally include a clear channel assessment (CCA) procedure that is performed in order to determine whether the unlicensed channel is available (e.g., unoccupied by other transmitters). In particular, the CCA procedure may include detecting an energy level on the unlicensed channel and determining whether the energy level satisfies (e.g., is less than or equal to) a threshold, sometimes referred to as an energy detection threshold and/or the like. When the energy level satisfies (e.g., does not equal or exceed) the threshold, the CCA procedure is deemed to be successful and the transmitting device may gain access to the unlicensed channel for a duration that may be referred to as a channel occupancy time (COT) during which the transmitting device can perform transmissions without performing additional LBT operations. When the energy level does not satisfy the threshold, the CCA procedure is unsuccessful and contention to access the unlicensed channel may be deemed unsuccessful.

When the CCA procedure results in a determination that the unlicensed channel band is unavailable (e.g., because the energy level detected on the unlicensed channel indicates that another device is already using the channel), the CCA procedure may be performed again at a later time. In environments in which the transmitting device may be starved of access to an unlicensed channel (e.g., due to WLAN activity or transmissions by other devices), an extended CCA (eCCA) procedure may be employed to increase the likelihood that the transmitting device will successfully obtain access to the unlicensed channel. For example, a transmitting device performing an eCCA procedure may perform a random quantity of CCA procedures (from 1 to q), in accordance with an eCCA counter. If and/or when the transmitting device senses that the channel has become clear, the transmitting device may start a random wait period based on the eCCA counter and start to transmit if the channel remains clear over the random wait period.

Accordingly, although a wireless network can be configured to use unlicensed spectrum to achieve faster data rates, provide a more responsive user experience, offload traffic from a licensed spectrum, and/or the like, the need to ensure fair coexistence with incumbent systems (e.g., WLAN devices) may hamper efficient usage of the unlicensed spectrum. For example, even when there is no interference, the LBT procedure used to ensure that no other devices are already using the channel introduces a delay before transmissions can start, which may degrade user experience, result in unacceptable performance for latency-sensitive or delay-sensitive applications, and/or the like. Furthermore, these problems may be exacerbated when the initial CCA procedure is unsuccessful, as the transmitting device can transmit on the channel only after performing an additional quantity of CCA procedures and determining that the channel has become clear and remained clear for a random wait period. Furthermore, in some cases, the COT obtained by an initiating transmitting device may have a duration that is longer than necessary for the transmitting device to perform the desired transmissions, which may lead to inefficient usage of the unlicensed channel.

Accordingly, in some cases, a wireless network may enable a COT obtained by a transmitting device to be shared with other nodes in order to improve access, efficiency, and/or the like for an unlicensed channel. For example, in downlink-to-uplink COT sharing over an access link, a network node may acquire a COT with an eCCA, and the COT may be shared with one or more UEs (e.g., UE 120, UE 305, and/or the like) that can then transmit uplink signals within the COT that was acquired by the network node 110. In this case, a UE attempting to initiate an uplink transmission within the COT shared with the network node can perform an uplink transmission without having to perform an LBT procedure (e.g., a Category-1 (CAT-1) LBT procedure, also referred to as no LBT), or the UE may perform the uplink transmission after performing a one-shot CCA with a shorter LBT procedure (e.g., a CAT-2 LBT procedure when the downlink-to-uplink gap duration is between 16 us and 25 us and/or a CAT-1 LBT procedure when a downlink-to-uplink gap duration is less than or equal to 16 μs).

Additionally, or alternatively, a wireless network may support uplink-to-downlink COT sharing from a UE to a network node over an access link. For example, a UE may perform a CAT-4 LBT procedure to initiate a COT (e.g., for a configured grant PUSCH or a scheduled uplink transmission), which can be shared with the network node via group common uplink control information (GC-UCI) that indicates a starting point and duration of the remaining portion of the COT to be shared with the network node. For example, the UE may perform the CAT-4 LBT procedure to initiate a COT having a 4 millisecond (ms) duration, and may only use 1 ms of the COT such that the remaining 3 ms of the COT can be shared with another device. In this case, the network node may need to acquire the remaining portion of the COT immediately after the last transmission by the UE in the earlier (used) portion of the COT by performing CAT-1 or CAT-2 LBT sensing using a 16 us gap or a 25 us gap before the transmission by the network node. In this way, the network node may transmit control and/or broadcast signals and/or channels for any UE served by the network node, provided that the transmission contains a downlink signal, channel, and/or other transmission (e.g., a PDSCH, PDCCH, reference signal, and/or the like) intended to be received by the UE that initiated the COT.

Additionally, or alternatively, a wireless network may support UE-to-UE COT sharing over a sidelink. For example, as shown in FIG. 5A, and by reference number 510, a COT acquired by an initiating UE (e.g., UE 305-1) may be shared with another UE (e.g., UE 305-2) in a frequency division multiplexing (FDM) mode by dividing the COT into multiple interlaces (e.g., time periods during which one or more UEs may perform transmit operations). For example, as shown in FIG. 5A, the initiating UE may use one or more sidelink resources (e.g., time and frequency resources) to transmit in a first interlace after the COT has been acquired, and a responding UE may use sidelink frequency resources that are non-overlapping with sidelink frequency resources used by the initiating UE to perform transmit operations in subsequent interlaces. Accordingly, as shown in FIG. 5A, FDM or interlace-based COT sharing may introduce short transmission gaps between interlaces to allow other UEs to perform transmit operations in subsequent interlaces during a shared COT, and SCI transmitted by the initiating UE may carry information to support the interlace-based COT sharing. For example, SCI that contains COT sharing information may be treated as a COT sharing grant from the initiating UE that is sharing the COT, and all responding UEs that are eligible to share the COT (e.g., based on a distance metric, a group identifier, and/or other information) may take the SCI as a COT sharing grant. In this case, a responding UE may perform a CAT-1 or CAT-2 LBT procedure prior to transmitting at any time up to the end of the COT, and a transmission gap limit may not apply (e.g., UEs sharing the COT can start to transmit anywhere within the shared COT region even if there is a greater than 25 µs gap between the transmission and the end of the last transmission by the COT-initiating UE).

Additionally, or alternatively, as shown by reference number 520, UE-to-UE COT sharing may be enabled in a time division multiplexing (TDM) mode. In this case, the total COT may be divided into an initial time period during which the initiating UE may perform transmissions, which may include one or more SCI transmissions that include a COT-sharing signal to indicate when the initial transmission will end, a remaining duration of the COT that is available for sharing, and/or the like. Accordingly, one or more responding UEs may monitor the SCI transmitted by other UEs (e.g., the initiating UE) to recover COT sharing information that can be used to perform transmissions during a time period that corresponds to a shared COT.

Accordingly, as described above, UE-to-UE COT sharing may enable better access to unlicensed spectrum, more efficient usage of unlicensed spectrum, and/or the like by enabling multiple UEs to perform transmissions during a COT that is obtained by an initiating UE (e.g., a UE that successfully performed a CAT-4 LBT procedure to acquire access to an unlicensed channel). However, in some cases, implementing UE-to-UE COT sharing using the FDM and/or TDM schemes shown in FIG. 5A may be associated with inefficient resource usage. For example, in the FDM and TDM schemes shown in FIG. 5A, the UE initiating the COT generally finishes transmitting at the beginning of the COT and then shares the remaining (unused) portion of the COT with other UEs. As a result, there may be inefficient usage of frequency resources in the earlier (used) portion of the COT. For example, the UE initiating the COT may occupy only one or two subchannels and/or interlaces in the used portion of the COT, meaning that other UEs could potentially conduct simultaneous transmissions in the used portion of the COT using subchannels and/or interlaces that are not occupied by the COT-initiating UE (e.g., because a sidelink UE is not expected to perform unicast transmissions to multiple UEs at the same time, and therefore does not need to utilize all available frequency resources).

Accordingly, some aspects described herein may enable UE-to-UE COT sharing during a used portion of a shared COT (e.g., while the initiating UE is still transmitting). For example, as shown in FIG. 5B, and by reference number 530, UE-to-UE COT sharing while the COT-initiating UE is transmitting may be enabled by dividing a COT initiated by a UE into an FDM region in which the COT-initiating UE reserves a set of time and frequency resources reserved to transmissions by the COT-initiating UE and a TDM region in which other UEs sharing the COT may transmit. In this case, as shown by reference number 532, SCI may include a COT sharing signal (e.g., COT system information (COT-SI)) that indicates shareable resources in a time and frequency domain. For example, in FIG. 5B, the shaded rectangles may indicate shareable resources that other UEs can use to transmit without colliding with non-shareable resources reserved for transmissions by the COT-initiating UE.

Although this approach may improve resource utilization within a shared COT by allowing other UEs to join and conduct transmissions over the unlicensed channel concurrently with the COT-initiating UE, the COT sharing signal may be associated with a large overhead in cases where the shareable resources are disjoint and varying across the COT. For example, the UE initiating the COT may select different subchannels that are used for transmissions in different slots or symbols within the COT in order to gain frequency diversity. Furthermore, the UE may use a legacy sidelink resource selection algorithm to randomly select subchannels and/or slots within a resource selection window, which generally makes the shareable resources highly disjoint. Accordingly, as shown by reference number 534, the COT sharing signal may have a large overhead in cases where the shareable resources are disjoint across the shared COT (e.g., because the COT sharing signal needs to indicate a rectangle that corresponds to each set of shareable resources in the time and frequency domain and needs to further indicate the TDM region that occurs after the COT-initiating UE has finished transmitting). The potentially large overhead of the COT sharing signal may be especially problematic in a sidelink configuration, where the COT sharing signal may be carried in SCI-1 to enable a reduced processing timeline and power saving. For example, SCI-1 is carried over a PSCCH and has a small payload size to enable decoding by all UEs, and may therefore be unable to accommodate a COT sharing signal with a large payload. Furthermore, SCI-2 carried over a PSSCH may be unsuitable to carry the COT sharing signal because SCI-2 is not decoded by all UEs and/or some UEs may lack capabilities to support SCI-2.

Some aspects described herein relate to techniques and apparatuses to enable an LBT-based resource modification and reduced COT sharing signaling for sidelink communication in unlicensed spectrum. For example, as described herein, a UE that has one or more packets to transmit may initially perform random resource selection within a resource selection window, as the UE may be unable to determine prior to a successful LBT procedure whether the resources that are selected will be within a COT initiated by the UE or piggybacked on a shared COT initiated by a different UE. In some aspects, the UE may attempt an LBT procedure (e.g., a CAT-4 LBT procedure), and may rearrange or otherwise adjust the resources that were initially selected to be contiguous in a time domain and/or clustered in a frequency domain based on the LBT procedure succeeding. In this way, the UE may transmit SCI including a COT sharing signal to block other UEs from performing interfering transmissions in the used COT region with contiguous and/or clustered transmission, and adjusting the reserved resources to be contiguous in the time domain and/or clustered in frequency domain may enable a reduced overhead for signaling the shareable resources. For example, the UE initiating the COT may transmit SCI to indicate non-shareable resources (e.g., the time and frequency resources reserved to initial transmissions by the UE), and responding UEs may select other resources, excluding the non-shareable resources, to use for transmissions in the used portion of the shared COT. Additionally, or alternatively, the UE may select non-shareable resources according to a frequency hopping pattern, and the SCI indicating non-shareable resources may include information to enable responding devices to derive the frequency hopping pattern used by the COT-initiating UE (and therefore the resources to exclude when selecting resources in the used region of the shared COT).

As indicated above, FIGS. 5A-5B are provided as examples. Other examples may differ from what is described with regard to FIGS. 5A-5B.

Figure 6:
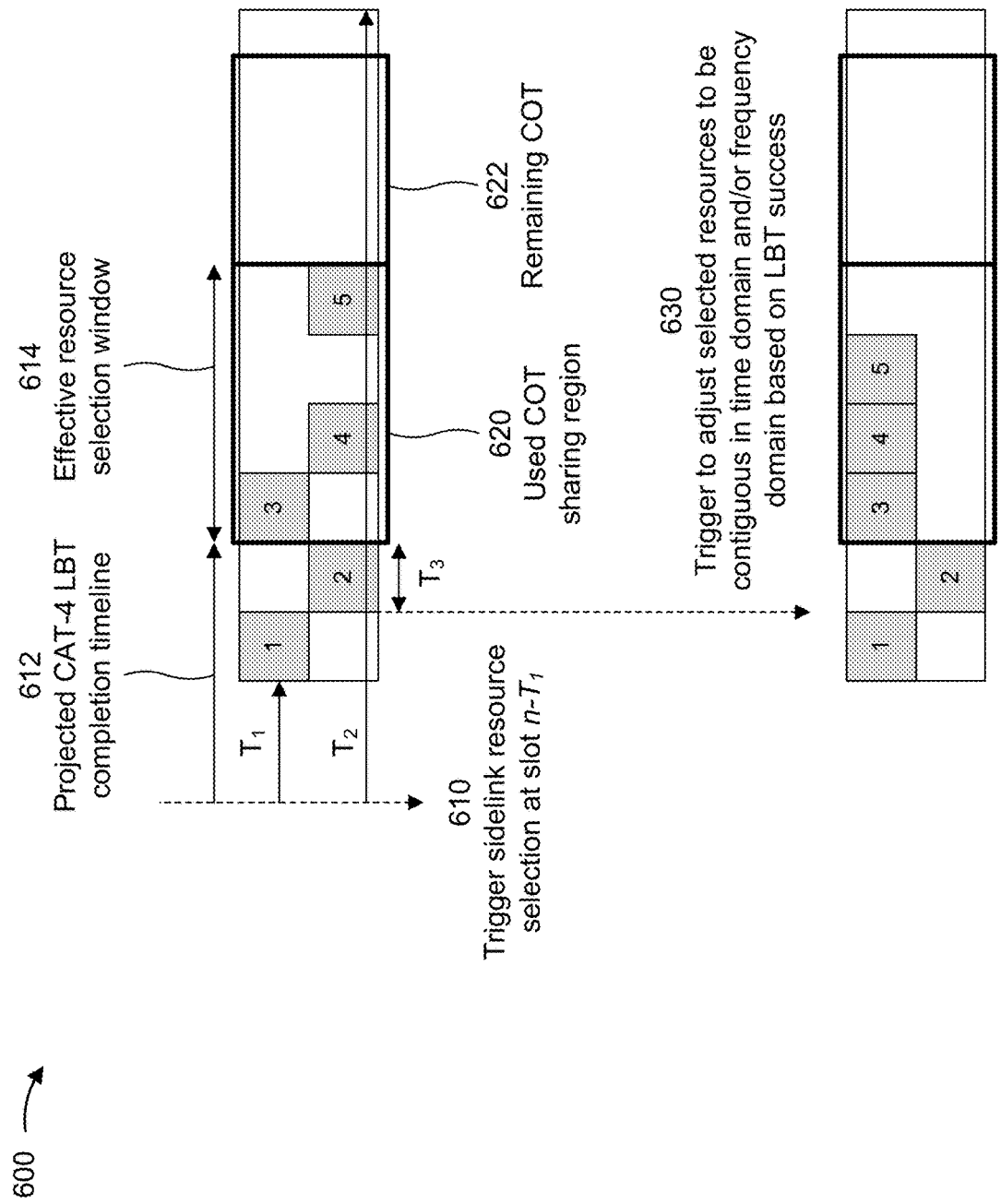
FIG. 6 is a diagram illustrating an example of listen-before-talk-based resource modification for sidelink communication in the unlicensed spectrum, in accordance with the present disclosure.

FIG. 6 is a diagram illustrating an example 600 associated with LBT-based resource modification for sidelink communication in an unlicensed spectrum, in accordance with various aspects of the present disclosure.

For example, as shown by reference number 610, a UE may trigger a sidelink resource selection in a slot $n-T_1$, where $n-T_1$ is a time when one or more packets corresponding to one or more initial transport block transmissions arrive, and $T_1$ is duration between the time when the one or more arrive the UE and a time when a first packet is to be transmitted. In some aspects, when the one or more packets arrive at the UE, the UE may determine whether there is a shared COT available to exploit (e.g., within a duration $T_2$ after the time when the one or more packets arrive at the UE). In cases where the UE determines that another shared COT is available, the UE may transmit the one or more packets in the shared COT (e.g., by performing a Type-0 random resource selection in an effective resource selection window that is defined for a remaining COT shared by another UE based at least in part on a COT sharing signal transmitted by the other UE that initiated the shared COT).

Alternatively, in cases where the UE determines that a shared COT is unavailable, the UE may perform random resource selected in a projected used COT region. For example, as shown in FIG. 6, the UE may determine a projected CAT-4 LBT completion timeline 612 (e.g., a projected duration for performing a successful CAT-4 LBT procedure needed to initiate a COT), and may further determine a resource selection window that covers a time period associated with the packets to be transmitted by the UE. For example, in FIG. 6, five (5) packets numbered 1-5 may arrive at the UE, and a time period in which the 5 packets are to be transmitted may define the resource selection window. However, because the UE may be required to perform a successful CAT-4 LBT procedure before transmitting, an effective resource selection window 614 may encompass a reduced portion of the overall resource selection window that accounts for the projected CAT-4 LBT completion timeline 612. For example, the UE may perform a Type-1 random resource selection in the effective resource selection window 614, which generally corresponds to a projected used COT sharing region 620 (e.g., a region of a COT that is used for transmission by the initiating UE and shared with other UEs). In this case, a portion of the projected COT that occurs after the transmissions that are scheduled for the UE (e.g., after the projected used COT sharing region 620) may be a remaining COT region 622 that other UEs can join by performing a successful CAT-1 or Category-2 LBT procedure.

Accordingly, as shown in FIG. 6, the UE may perform a random resource selection within the effective resource selection window 614 corresponding to the projected used COT sharing region 620. For example, among the five packets that arrive in slot $n-T_1$, the UE may perform random resource selection for the three packets that are in the effective resource selection window 614 corresponding to the projected used COT sharing region 620. Accordingly, resources for the first two packets (numbered 1 and 2) are excluded from the random resource selection because the first two packets are within a projected contention window countdown dead zone (e.g., occur during the projected CAT-4 LBT completion timeline). For example, resource selection is performed at a medium access control (MAC) layer and the LBT procedure is performed at a physical (PHY) layer, which can result in uncertainty as to when the effective resource selection window 614 is to begin. For example, the MAC layer may select a contention window based on a priority class associated with the traffic to be transmitted, and the PHY layer may randomly select a countdown value for performing the LBT procedure based on the value of the contention window indicated by the MAC layer. Accordingly, the MAC layer may be unable to determine the countdown value used by the PHY layer, the MAC layer may perform the initial random resource selection within the effective resource selection window 614 based on the maximum duration for the projected CAT-4 LBT completion timeline 612.

Accordingly, in cases where the UE attempts and performs a successful CAT-4 LBT procedure to initiate a COT, the UE may generally start to transmit on one or more subchannels in the used COT sharing region 620. In such cases, the transmissions by the UE may block other nearby UEs from performing a successful CAT-4 LBT procedure on each of the subchannels that are occupied by the UE. As described above, this may result in inefficient usage of frequency resources and/or may lead to COT sharing signaling having a large overhead. For example, random resource selection at the initial stage (e.g., prior to the UE performing a successful CAT-4 LBT procedure to initiate a COT) may be useful to reduce a probability that the resource(s) selected by the UE will collide with non-shareable resources in a COT initiated by another UE (e.g., because the UE initially cannot know whether the randomly selected resource(s) will be in a COT initiated by the UE or piggybacked in an FDM mode in a used COT region shared with another initiating UE. However, if another shared COT is unavailable to exploit and the UE is able to perform a successful CAT-4 LBT procedure, the UE does not have to respect resources that may be reserved by other UEs and may select any suitable resources in the COT that was initiated by the UE. In other words, the random resource selection algorithm that the UE employs to perform the initial resource selection is generally designed to avoid collisions in licensed spectrum, but avoiding such collisions is unnecessary in unlicensed spectrum because the CAT-4 LBT procedure ensures that there are no other devices transmitting on the unlicensed subchannels.

Accordingly, as shown by reference number 630, the UE may trigger an adjustment to the selected resources within the effective resource selection window 614 based at least in part on a successful CAT-4 LBT procedure. In some aspects, the UE may trigger the adjustment based at least in part on determining that an attempted CAT-4 LBT procedure was successful, and that the LBT success occurred at least $n-T_3$ before a preselected resource (e.g., a resource selected at slot n) is confirmed, where $T_3$ is a minimum duration prior to a transmission when resource reselection or modification at the PHY layer is feasible. In this case, as shown in FIG. 6, the preselected resources are adjusted to be contiguous in a time domain, and may be further adjusted to occupy a minimum number of subchannels. For example, one or more preselected resources that occur later within the effective resource selection window 614 may be moved to earlier time resources (e.g., earlier symbols or slots) to close transmission gaps, and subchannels associated with preselected resources that occur later within the effective resource selection window 614 may be aligned with a subchannel associated with a first resource within the effective resource selection window 614. For example, as shown in FIG. 6, resource 4 is aligned with a subchannel selected for resource 1, and resource 5 is moved to a preceding slot to close a transmission gap and also aligned with the subchannel selected for resource 1. Additionally, or alternatively, in cases where a particular subchannel is occupied in a given slot, another resource in the same slot may be moved to an adjacent subchannel such that the resources occupy a minimum number of subchannels. Furthermore, in some aspects, the selected resources may be adjusted such that a 16 µs gap is provided between consecutive transmissions in order to allow other UEs to perform a CAT-2 LBT procedure to transmit in the used COT sharing region 620. Accordingly, because resources 4 and 5 are adjusted in the time and/or frequency domain, the adjustment may be triggered if the CAT-4 LBT procedure succeeds at least $T_3$ prior to the time resources associated with resources 4 and 5.

In some aspects, the adjustment to the resource selection may be associated with one or more initial transport block transmissions, and any resources previously reserved for retransmissions by the UE initiating the COT may be maintained. For example, the resources previously reserved for retransmissions by the initiating UE may be indicated in SCI-1 that other UEs may be in the process of decoding. Accordingly, other UEs that join the COT may respect the resource reservation(s) for the retransmissions even if the reserved resources are in a shareable resource region, as described in more detail below. In this case, where one or more resources reserved for a retransmission are in the same subchannel occupied by a first prescheduled resource within the used COT sharing region 620, the first prescheduled resource may be adjusted to occupy the same slot as the resource(s) reserved for a retransmission in a next available subchannel adjacent to the subchannel reserved for the retransmission. In this way, the adjustment to the resource selection ensures contiguous transmission within the used COT sharing region 620, as the retransmission on reserved resources may or may not occur (e.g., depending on HARQ feedback for the initial transmission).

In some aspects, as described above, the CAT-4 LBT procedure may be performed at the PHY layer, which may trigger the MAC layer to perform the resource modification to adjust the preselected resources to be contiguous in the time domain and/or the frequency domain when the CAT-4 LBT procedure is successful. For example, at the time that the resources are preselected, the preselected resources are unconfirmed (e.g., because the CAT-4 LBT procedure may fail) and are not indicated as reserved resources in SCI that is transmitted over-the-air to other UEs. Accordingly, the resource reselection or modification may be triggered at the MAC layer based at least in part on the successful CAT-4 LBT procedure occurring at least $T_3$ ahead of a resource that is adjusted in the time domain and/or the frequency domain, where $T_3$ is a minimum duration to process the resource adjustment. Furthermore, in some aspects, the MAC layer may adjust the first resource (e.g., a reference resource that defines the subchannel to which later resources are moved) in cases where a duration between a trigger indicating that the CAT-4 LBT succeeded and a start of the first resource satisfies (e.g., equals or exceeds) a threshold. For example, as described above, the projected CAT-4 LBT completion timeline 612 may be based on a worst-case scenario (e.g., the PHY layer selecting a maximum countdown value), whereby the CAT-4 LBT procedure may be successful earlier than the projected CAT-4 LBT completion timeline 612 that is determined by the MAC layer. For example, when the MAC layer signals a contention window value to the PHY layer, the PHY layer selects a random number, q, between zero and the contention window value, and the MAC layer determines the projected CAT-4 LBT completion timeline 612 based on the maximum value for q (e.g., the contention window value). When q counts down to zero, the PHY layer attempts the CAT-4 LBT procedure and may trigger the MAC layer to perform resource modification if the CAT-4 LBT procedure is successful. Accordingly, if a duration between the trigger received at the MAC layer to indicate a CAT-4 LBT success and the first (reference) resource in the effective resource selection window 614 satisfies a threshold (e.g., equals or exceeds $T_3$), the MAC layer may move the first resource to an earlier slot and later resources within the effective resource selection window 614 may be adjusted accordingly (e.g., moved to earlier slots to be contiguous with the first resource in at least the time domain).

In some cases, an out-of-COT reservation may allow a first UE to reserve future COT resources for retransmission or for new transport blocks. A second UE (and/or other UEs) may be configured to exploit (e.g., use) the reserved COT resources with a later starting position using TDM. With TDM, different sidelink transmitters may compete for COT among themselves and with other RAT technologies, such as Wi-Fi, and may eventually need to clear the LBT at different slots prior to transmission. Using this reservation framework, if different sidelink transmitters perform FDM in different interlaces and start the COT at the same time using coordinated channel access, the reserved COT resources may be able to be better utilized. For example, competition for LBT among sidelink nodes and the number of LBT procedures that are needed may be reduced, which may help to improve channel access. However, performing out-of-COT reservation with UEs using FDM may result in wideband CAT-4 LBT procedures not clearing the same slot even when the LBT procedures start at the same time. For example, different FDM transmitters may choose a different random backoff number for the CAT-4 LBT and may not count down before the same slot or mini-slot. Additionally, or alternatively, if one FDM transmitter UE finishes a countdown at slot or mini-slot i and begins transmission at slot or mini-slot i+1, the FDM transmitter UE may block other FDM transmitter UEs that do not finish (or cannot finish) the countdown at the slot or mini-slot i.

Techniques and apparatuses are described herein for sidelink out-of-COT reservation. In some aspects, a UE may receive, via a sidelink communication, an indication that another UE has reserved a first COT resource of a plurality of COT resources. The UE may reserve a second COT resource of the plurality of COT resources via one or more slots associated with the first COT resource and using FDM channel access. Additionally, or alternatively, the UE may transmit a communication, via the one or more slots associated with the first COT resource, using a different interlace than an interlace that is associated with the first COT resource.

In some aspects, a UE-to-UE (e.g., sidelink) COT sharing procedure that involves a COT-sharing UE not transmitting to a COT-initiating UE may enhance resource sharing among slot-based channel access for sidelink and asynchronous Wi-Fi. In some aspects, coordinated FDM channel access may allow multiple transmitter UEs to access the resource(s) with synchronized CAT-4 LBT and to transmit to a plurality of respective receiver UEs.

In some aspects, a first UE may reserve a future COT resource using frequency domain resource assignment (FDRA) and LBT parameters for retransmission or for future transport blocks. Other UEs may join the first UE using coordinated FDM access (e.g., CAT-4 LBT) over the reserved COT resources. In some aspects, some or all of the sidelink nodes (e.g., UEs) may be able to reserve future COT resources. A later reserving node may need to align the FDRA and LBT parameters based at least in part on determining to join the coordinated channel access over the overlapping COT resources that were reserved by the earlier node. For example, the later reserving node may need to avoid the earlier chosen interlaces and may need to align a counter value, a defer duration, and a starting position, among other examples.

In some aspects, an out-of-COT frequency-only reservation may include FDRA (e.g., an FDRA and RB set) and time domain resource assignment (TDRA). In some aspects, the reserving UE may reserve a gap for CAT-4 LBT, and an end of the LBT window may indicate where the joining nodes may need to clear the LBT and perform a transmission. Otherwise, the joining nodes may need to refrain from transmitting in the reserved COT duration. In some aspects, the start of the LBT window may specify where the joining nodes are to start the LBT with the specified LBT parameters. In some aspects, an LBT parameter reservation may indicate one or more of a starting position, a backoff counter value, and/or a defer duration, among other examples.

In some aspects, the distributed mechanism described herein may enable multiple nodes to have synchronized CAT-4 LBT and FDM in different interlaces. Thus, a node may reuse the same COT resources more efficiently, which may reduce the number of LBT procedures that are needed and/or may improve the performance in the presence of asynchronous access (e.g., from Wi-Fi). In some aspects, if two sidelink nodes would like to synchronize on the CAT-4 LBT and FDM in different interlaces without coordination from a higher node (e.g., a base station), a Mode 2 reservation mechanism may be used to coordinate the LBT and the FDRA among the multiple nodes.

As indicated above, FIG. 6 is provided as an example. Other examples may differ from what is described with regard to FIG. 6.

Figure 7:
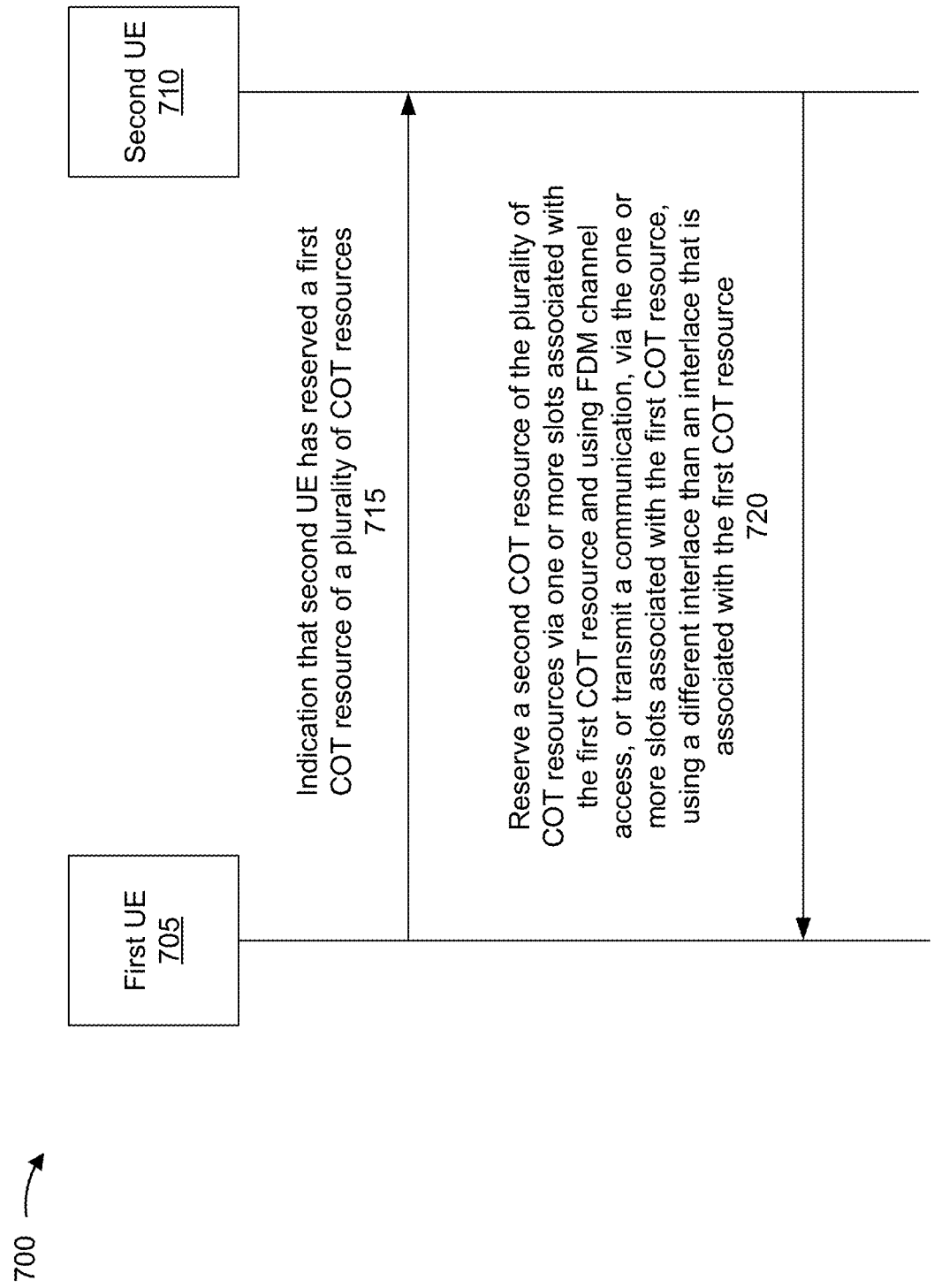
FIG. 7 is a diagram illustrating an example associated with sidelink out-of-COT reservation, in accordance with the present disclosure.

FIG. 7 is a diagram illustrating an example 700 of sidelink out-of-COT reservation, in accordance with the present disclosure. A first UE 705 may communicate with a second UE 710. The first UE 705 and/or the second UE 710 may include some or all of the features of the UE 120 described herein. In some aspects, the first UE 705 may include a plurality of first UEs 705 and/or the second UE 710 may include a plurality of second UEs 710. For example, one or more functions described as being performed by the second UE 710 may be performed by a plurality of UEs, such as a UE 710-1 and a UE 710-2.

As shown in connection with reference number 715, the first UE 705 may transmit, and the second UE 710 may receive, an indication that the first UE 705 has reserved a first COT resource of a plurality of COT resources. In some aspects, the first UE 705 may reserve the first COT resource, including FDRA and LBT parameters, among other examples, for retransmission or for future transport block transmission. As described in detail below, late coming UEs (e.g., the second UE 710) may join the first UE 705 using coordinated FDM channel access.

As shown in connection with reference number 720, the second UE 710 may reserve a second COT resource of the plurality of COT resources via one or more slots associated with the first COT resource and using FDM channel access. Additionally, or alternatively, the second UE 710 (or another UE) may transmit a communication, via the one or more slots associated with the first COT resource, using a different interlace than the interlace that is associated with the first COT resource.

In some aspects, the second UE 710 may join the first UE 705 using coordinated FDM channel access. For coordinated FDM channel access with CAT-4 LBT in the reserved COT resources, the late coming transmitter UEs (e.g., the second UE 710) may need to align an LBT starting point, a defer duration, and/or a backup counter, and may need to avoid the reserved interlaces. Additionally, or alternatively, the late coming transmitter UE may need to align a transmission slot and a starting position of a cyclic prefix extension (CPE). In some aspects, the second UE 710 may decode a prior reservation SCI and may reserve one or more COT resources that include the LBT window and FDRA. In some examples, the LBT window may overlap with the prior reservation. In other examples, the LBT window may not overlap with the prior reservation.

In some aspects, the second UE 710 may need to select an aligned LBT window and parameter and an FDRA for a future reserved COT slot if the second UE 710 is to perform the coordinated FDM access with the first UE 705. If the second UE 710 will not perform the coordinated FDM access with the first UE 705, the second UE 710 may select a different LBT window and parameter and/or a different FDRA. In some aspects, the second UE 710 may align a counter value, a defer duration, a starting position (e.g., an LBT parameter), and/or an LBT window for coordinated CAT-4 LBT. Additionally, or alternatively, the second UE 710 may align the LBT window only. In this case, the start of the LBT window may indicate where the joining nodes may start performing LBT, and the end of the LBT window may indicate where the joining nodes are to complete LBT and start the transmission, or where the LBT is to be stopped and no transmission is to occur for the reserved COT. In some aspects, the second UE 710 may select the reservation FDRA to avoid the previously selected interlaces. In some aspects, the second UE 710 may compare an SCI RSRP to an SCI RSRP threshold. The second UE 710 may align the LBT parameter and window and the FDRA based at least in part on the SCI RSRP satisfying the SCI RSRP threshold. Alternatively, the second UE 710 may not align the LBT parameter and window and the FDRA based at least in part on the SCI RSRP not satisfying the SCI RSRP threshold.

In some aspects, the second UE 710 may maintain a hop counter. The second UE 710 may include the hop counter and an original transmitter identifier (e.g., an identifier associated with the first UE 705) in the reservation SCI. The second UE 710 may join the same group for coordinated access based at least in part on the reservation SCI having a hop counter that is less than, or less than or equal to, a hop counter threshold. If the second UE 710 determines to join the group for coordinated access, the second UE 710 may need to respect the FDRA reservation from the prior reservation node within the same group, such as a prior reservation by the first UE 705.

In some aspects, the hop counter may keep track of the number of hops that the reservation SCI for coordinated FDM access propagates through. The originating transmitter identifier (e.g., the identifier associated with the first UE 705) may help to identify the group for coordinated access. In some aspects, setting the hop counter threshold may allow the range for coordinated access to be limited. For example, the second UE 710 may only join the group for coordinated access based at least in part on the reservation SCI having a hop counter value that is less than, or less than or equal to, the hop counter threshold. In some aspects, the FDRA reservation from the reservation SCI with a hop counter value that is greater than, or greater than or equal to, the hop counter threshold may still be valid if the second UE 710 determines to join the same group for coordinated access. For example, if the network has a common hop counter threshold, one or more bits in the reservation SCI may be saved by removing the LBT parameters. In this case, the indication of the transmitter identifier, the FDRA, and the LBT window may be sufficient.

In some aspects, the second UE 710 may transmit reservation SCI that indicates an LBT parameter, an LBT window, a reserved interlace, and/or a COT resource slot. The time domain reservation may reserve multiple contiguous COT slots and LBT windows. In some aspects, the time domain reservation may indicate an offset from the reservation SCI and/or the duration of the future COT slots. In some aspects, the LBT window may have one or more of the following example characteristics. In a first example, an end of the LBT window may specify where the joining nodes need to complete LBT and start a transmission. The LBT window may indicate the CPE and the reserved resources for the joining nodes to perform the CAT-4 LBT. In a second example, a start of the LBT window may indicate where each joining node may need to start performing the CAT-4 LBT based at least in part on the signaled LBT parameters, and the end of the LBT window may be the last point where each of the nodes can clear the LBT and begin a transmission. In some cases, if the countdown is earlier than the end of the LBT window, a node may be allowed to start a transmission.

In some aspects, the start of the LBT window may correspond to a start of the reserved COT slot(s). In this case, only the duration of the LBT window may need to be indicated in the reservation SCI signaling Additionally, or alternatively, the length of the LBT window may be RRC configured. In some aspects, the frequency domain reservation may indicate the reserved interlaces in the future COT slots. The FDRA may reserve different sets of interlaces for different slots in the future COT slots. In some aspects, the reservation SCI signaling may indicate the CPE starting position for the late coming transmitters (e.g., the second UE 710). By choosing the same starting position with the CPE, the FDM transmitters may not need to block each other based at least in part on the LBT being cleared in the same slot. In some aspects, the starting position of the FDM coordinated channel may be earlier than the regular out-of-COT reservation. In some aspects, the reservation SCI signaling may include an indicator that indicates whether the FDM coordinated channel is allowed or is not allowed. If the FDM coordinated channel is not allowed, the LBT parameters may not need to be signaled as this may just be the out-of-COT reservation with the exception that certain interlaces may be reserved. In some aspects, in combination with an in-COT reservation, the reserving UE may update the FDRA a few slots after the COT is initiated.

In some aspects, the reservation SCI signaling may indicate random backoff counter coordination. Two nearby transmitters using interlace FDM and under similar interference conditions may have a higher chance of clearing the LBT at the same time. In some cases, the two FDM transmitters may need to have the same traffic type and random counter value in order to clear the LBT at the same time. However, this may be difficult in the case of wideband CAT-4 LBT. As described herein, different LBT transmitters may select different random backoff numbers and defer periods for the CAT-4 LBT. Thus, they may not count down before the same slot or mini-slot. Additionally, or alternatively, if one FDM transmitter UE finishes a countdown at a slot or mini-slot i and begins transmission at slot or mini-slot i+1, the FDM transmitter UE may block other FDM transmitter UEs that do not finish the countdown at the slot or mini-slot i.

In some aspects, the reservation SCI may indicate a backoff counter value to be used by other FDM UEs (e.g., the second UE 710) for all subchannels or interlaces. In some aspects, FDM transmitters that are subject to the same interference pattern may be enabled to clear the CAT-4 LBT at the same time and to start transmission at the same slot or mini-slot without blocking each other. In some aspects, for a sidelink per-slot reservation scheme, the backoff counter value may be applicable to the slots in the TDRA only. In some aspects, for frequency-only out-of-COT reservation, the backoff counter value may be applicable to all of the slots in the specified window.

In some aspects, the defer duration may be subject to channel access priority class (CAPC), and FDM UEs with different traffic priority may not clear the LBT at the same time. In this case, two example options regarding the defer duration may be possible. In a first example, the reserving transmitter (e.g., the first UE 705) may include an indication of the CAPC and/or the defer duration in the SCI, and the late coming UE (e.g., the second UE 710) may use the same defer duration. For example, irrespective of the traffic priority of the second UE 710, the second UE 710 may use the same defer duration as the first UE 705. In a second example, the second UE 710 may select the defer duration based at least in part on the CAPC of the second UE 710, and the FDM may be opportunistic. In an example with different defer periods, the FDM UEs with different traffic priorities may or may not clear the LBT before the same slot.

In some aspects, the SCI may signal a backoff counter value per priority class for the other transmitter. The reserving transmitter (e.g., the first UE 705) may select different random values for different CAPCs and may signal the chosen backoff counter value via SCI. The late coming UE (e.g., the second UE 710) that is using the reserved COT resources may need to use the random counter value based at least in part on the traffic priority and the reservation SCI. For example, the second UE 710 may select the counter value from the list of counter values signaled in the reservation SCI based at least in part on the traffic priority.

In some aspects, there may be multiple reservation SCIs from different transmitters. It may be desirable to only synchronize the LBT parameters among nearby SL nodes as they may be impacted by similar interference. For example, if two SL nodes are far apart, the interference may be different, and the sync counter value may not be useful. Alternatively, if the two sidelink nodes are close to each other, the reserving node may be configured to perform the window update over the reserved COT resources.

In some aspects, the receiver of the reservation SCI (e.g., the second UE 710) may use the LBT parameters and/or the LBT window from the strongest SCI associated with the slots. The reservation SCI RSRP may need to satisfy the SCI RSRP threshold, as described above. The SCI may be first stage SCI (SCI-1). In some aspects, the second UE 710 starting the LBT at time instance i may use the backoff values and starting position from the dominant reservation SCI associated with the time instance i. If the reserving transmitter is far away, there may be a smaller likelihood that the two transmitters will clear the LBT at the same time. In some aspects, the receiver (e.g., the second UE 710) may only respect the reserved backoff values based at least in part on the SCI RSRP satisfying the SCI RSRP threshold, or based at least in part on the distance to the reserving transmitter being less than, or less than or equal to, a distance threshold.

As described above, performing out-of-COT reservation with UEs using FDM may result in wideband CAT-4 LBT procedures not clearing the same slot even when the LBT procedures start at the same time. Using the techniques and apparatuses described herein, the second UE 710 may receive, via a sidelink communication, an indication that the first UE 705 has reserved a first COT resource of a plurality of COT resources. The second UE 710 may reserve a second COT resource of the plurality of COT resources via one or more slots associated with the first COT resource and using FDM channel access. Additionally, or alternatively, the second UE 710 may transmit a communication, via the one or more slots associated with the first COT resource, using a different interlace than an interlace that is associated with the first COT resource. Therefore, coordinate access for out-of-COT reservations may be improved.

As indicated above, FIG. 7 is provided as an example. Other examples may differ from what is described with regard to FIG. 7.

Figure 8:
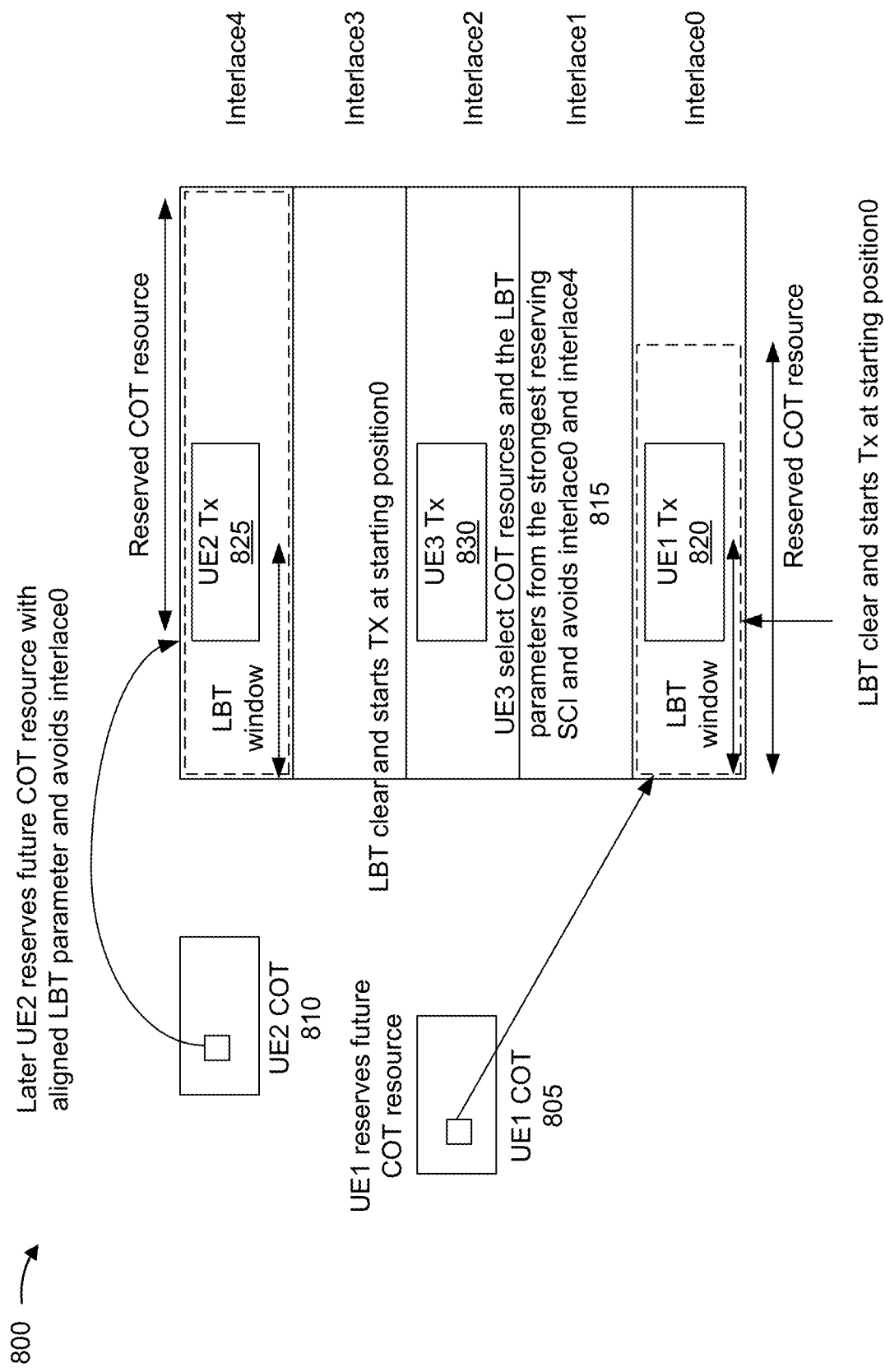
FIG. 8 is a diagram illustrating an example associated with frequency division multiplexing channel access with full-duplex out-of-COT reservation, in accordance with the present disclosure.

FIG. 8 is a diagram illustrating an example 800 of coordinated FDM channel access with full-duplex (FD) out-of-COT reservation, in accordance with the present disclosure. A first UE (UE1), a second UE (UE2), and a third UE (UE3) may reserve one or more COT resources. As shown by reference number 805, during a UE1 COT, the UE1 may reserve one or more future COT resources. For example, the UE1 may reserve the interlace0. As shown by reference number 810, during a UE2 COT, the UE2 may reserve one or more future COT resources. The UE2 may reserve the future COT resources with an aligned LBT parameter and may avoid interlace0. For example, the UE2 may reserve the interlace4. As shown by reference number 815, the UE3 may select one or more COT resources and LBT parameters from the strongest reserving SCI, and may avoid interlace0 and interlace4. For example, the UE3 may reserve the interlace3. As shown by reference number 820, the UE1 may perform a transmission within the reserved interlace0. As shown by reference number 825, the UE2 may perform a transmission within the reserved interlace4. As shown by reference number 830, the UE3 may perform a transmission within the reserved interlace2.

As indicated above, FIG. 8 is provided as an example. Other examples may differ from what is described with regard to FIG. 8.

Figure 9:
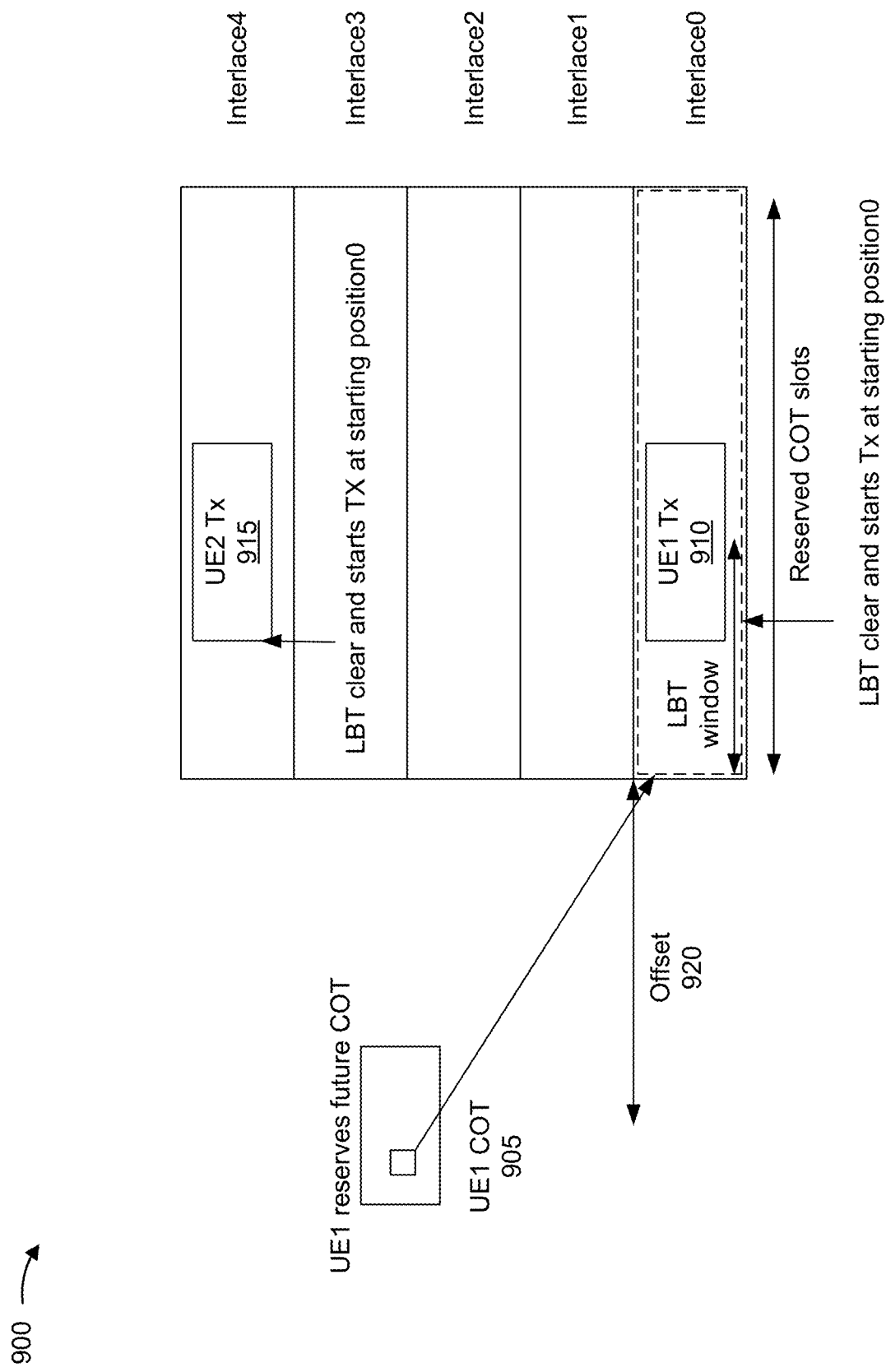
FIG. 9 is a diagram illustrating an example associated with reservation sidelink control information signaling, in accordance with the present disclosure.

FIG. 9 is a diagram illustrating an example 900 of reservation SCI signaling, in accordance with the present disclosure. A first UE (UE1) and a second UE (UE2) may reserve one or more COT resources. As shown by reference number 905, during a UE1 COT, the UE1 may reserve one or more future COT resources. For example, the UE1 may reserve interlace0. As shown by reference number 910, the UE1 may perform a transmission within the interlace0. As shown by reference number 915, the UE2 may perform a transmission that avoids the interlace0, such as a transmission that occurs within the interlace4. In some aspects, the time domain reservation may indicate an offset 920 from the reservation SCI and/or the duration of the future COT slots. As described herein, the LBT window may have one or more of the following example characteristics. In a first example, an end of the LBT window may specify where the joining nodes need to complete LBT and start a transmission. The LBT window may indicate the CPE and the reserved resources for the joining nodes to perform the CAT-4 LBT. In a second example, a start of the LBT window may indicate where each joining node may need to start performing the CAT-4 LBT based at least in part on the signaled LBT parameters, and the end of the LBT window may be the last point where each of the nodes can clear the LBT and begin a transmission.

As indicated above, FIG. 9 is provided as an example. Other examples may differ from what is described with regard to FIG. 9.

Figure 10:
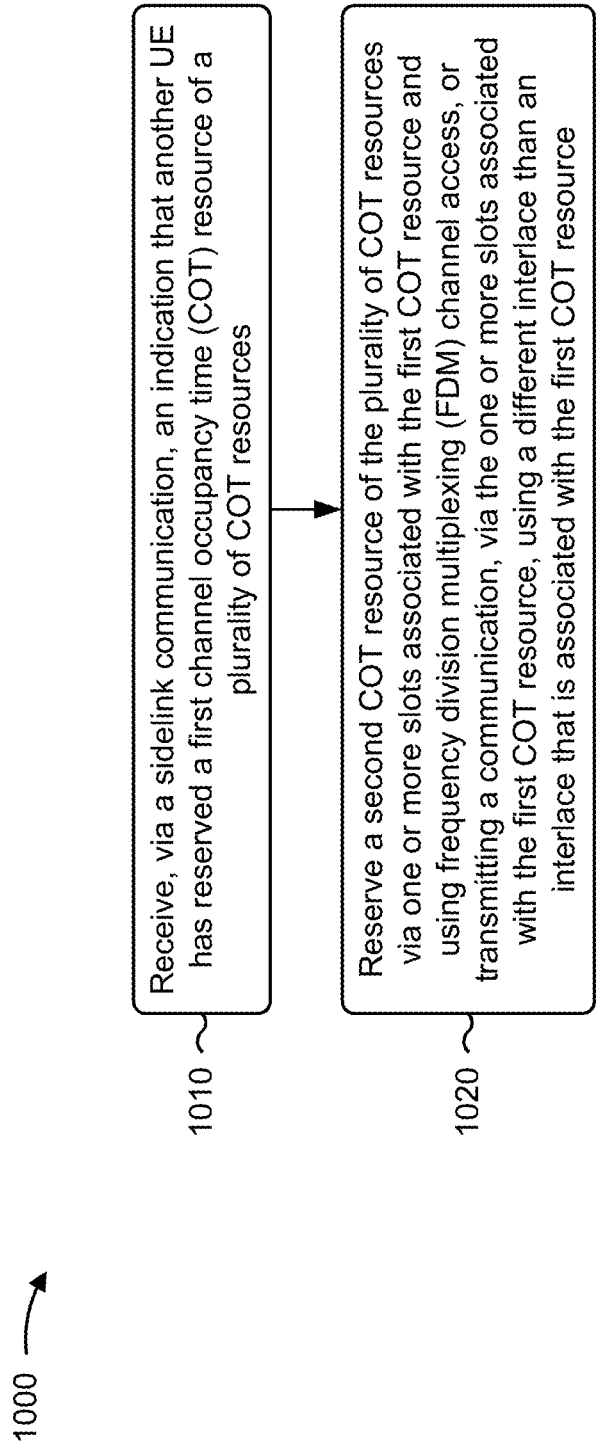
FIG. 10 is a diagram illustrating an example process associated with sidelink out-of-COT reservation, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with sidelink out-of-COT reservation.

As shown in FIG. 10, in some aspects, process 1000 may include receiving, via a sidelink communication, an indication that another UE has reserved a first COT resource of a plurality of COT resources (block 1010). For example, the UE (e.g., using communication manager 140 and/or reception component 1202, depicted in FIG. 12) may receive, via a sidelink communication, an indication that another UE has reserved a first COT resource of a plurality of COT resources, as described above.

As further shown in FIG. 10, in some aspects, process 1000 may include reserving a second COT resource of the plurality of COT resources via one or more slots associated with the first COT resource and using FDM channel access, or transmitting a communication, via the one or more slots associated with the first COT resource, using a different interlace than an interlace that is associated with the first COT resource (block 1020). For example, the UE (e.g., using communication manager 140 and/or reservation component 1208, depicted in FIG. 12) may reserve a second COT resource of the plurality of COT resources via one or more slots associated with the first COT resource and using FDM channel access, or transmit a communication, via the one or more slots associated with the first COT resource, using a different interlace than an interlace that is associated with the first COT resource, as described above.

Process 1000 may include additional aspects, such as any single aspect or any combination of aspects described below and/or in connection with one or more other processes described elsewhere herein.

In a first aspect, reserving the second COT resource comprises reserving the second COT resource during a time period that is outside of the second COT resource.

In a second aspect, alone or in combination with the first aspect, reserving the second COT resource comprises aligning a listen-before-talk starting point, a defer duration, and a backup counter to avoid the first COT resource.

In a third aspect, alone or in combination with one or more of the first and second aspects, reserving the second COT resource comprises aligning a transmission slot and a starting position of a cyclic prefix extension to avoid the first COT resource.

In a fourth aspect, alone or in combination with one or more of the first through third aspects, process 1000 includes selecting a LBT window, an LBT parameter, and a FDRA parameter prior to reserving the second COT resource or transmitting the communication via the different interlace.

In a fifth aspect, alone or in combination with one or more of the first through fourth aspects, selecting the LBT window, the LBT parameter, and the FDRA parameter comprises aligning a counter value, a defer duration, and a starting position associated with an LBT procedure.

In a sixth aspect, alone or in combination with one or more of the first through fifth aspects, selecting the LBT window, the LBT parameter, and the FDRA parameter comprises selecting the LBT window, the LBT parameter, and the FDRA parameter based at least in part on a SCI reference signal received power (RSRP) measurement satisfying an SCI RSRP threshold.

In a seventh aspect, alone or in combination with one or more of the first through sixth aspects, process 1000 includes transmitting SCI that includes an indication of a hop counter and an identifier associated with the other UE, wherein reserving the second COT resource or transmitting the communication via the different interlace comprises reserving the second COT resource or transmitting the communication via the different interlace based at least in part on a value of the hop counter failing to satisfy a hop counter threshold.

In an eighth aspect, alone or in combination with one or more of the first through seventh aspects, reserving the second COT resource further comprises avoiding the first COT resource and one or more other COT resources that are reserved by a group of UEs for coordinated channel access, wherein the group of UEs for coordinated channel access includes the other UE.

In a ninth aspect, alone or in combination with one or more of the first through eighth aspects, reserving the second COT resource further comprises reserving the second COT resource based at least in part on the value of the hop counter being greater than, or greater than or equal to, the hop counter threshold, and based at least in part on the UE being included in the group of UEs for coordinated channel access.

In a tenth aspect, alone or in combination with one or more of the first through ninth aspects, process 1000 includes transmitting or receiving SCI that includes an indication of a LBT parameter, an LBT window, an interlace, and the second COT resource.

In an eleventh aspect, alone or in combination with one or more of the first through tenth aspects, a time domain resource reservation associated with the SCI indicates a plurality of contiguous COT resources and the LBT window.

In a twelfth aspect, alone or in combination with one or more of the first through eleventh aspects, an end of the LBT window indicates a location where the UE and the other UE are to complete an LBT procedure and initiate one or more transmissions using the plurality of COT resources.

In a thirteenth aspect, alone or in combination with one or more of the first through twelfth aspects, a start of the LBT window indicates a location where the UE and the other UE are to start performing an LBT procedure based at least in part on the LBT parameter, and an end of the LBT window indicates a last location where the UE and the other UE are to complete the LBT procedure and initiate one or more transmissions using the plurality of COT resources.

In a fourteenth aspect, alone or in combination with one or more of the first through thirteenth aspects, a frequency domain resource reservation associated with the SCI indicates one or more reserved interlaces in the second COT resource.

In a fifteenth aspect, alone or in combination with one or more of the first through fourteenth aspects, the SCI further includes an indication of a cyclic prefix extension starting position or an indication of whether a frequency division multiplexing coordinated channel is allowed.

In a sixteenth aspect, alone or in combination with one or more of the first through fifteenth aspects, process 1000 includes transmitting or receiving SCI that indicates a backoff counter value to be used by the other UE for all interlaces associated with the plurality of COT resources.

In a seventeenth aspect, alone or in combination with one or more of the first through sixteenth aspects, the SCI includes an indication of a channel access priority class parameter or defer duration.

In an eighteenth aspect, alone or in combination with one or more of the first through seventeenth aspects, process 1000 includes selecting a defer duration based at least in part on a channel access priority class associated with the UE.

In a nineteenth aspect, alone or in combination with one or more of the first through eighteenth aspects, process 1000 includes transmitting or receiving SCI that indicates one or more signal backoff counter values per priority class.

In a twentieth aspect, alone or in combination with one or more of the first through nineteenth aspects, process 1000 includes selecting the second COT resource using a LBT parameter or an LBT window that is indicated in SCI associated with the plurality of COT resources and based at least in part on an SCI RSRP being greater than, or greater than or equal to, an SCI RSRP threshold.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
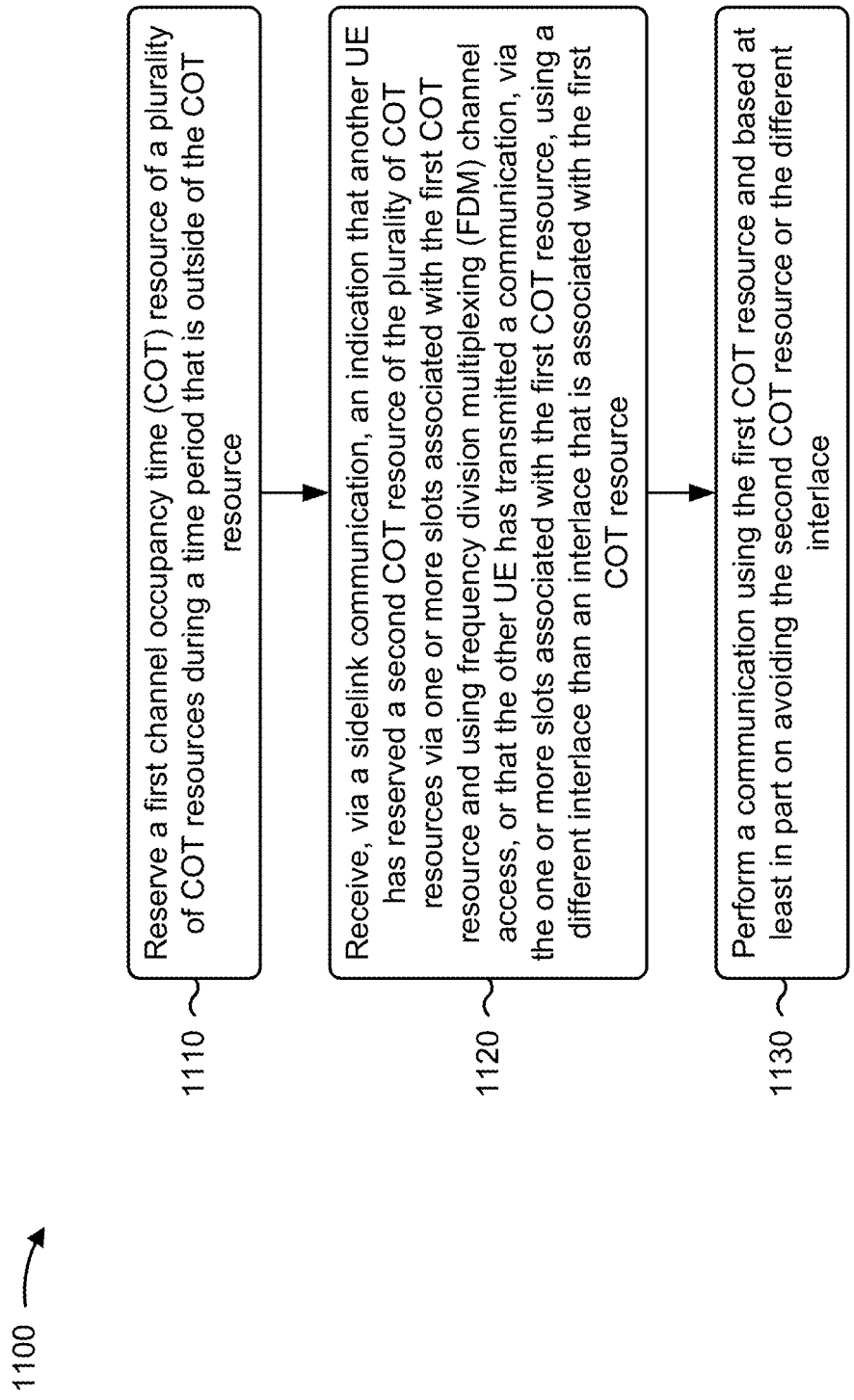
FIG. 11 is a diagram illustrating an example process associated with sidelink out-of-COT reservation, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with sidelink out-of-COT reservation.

As shown in FIG. 11, in some aspects, process 1100 may include reserving a first COT resource of a plurality of COT resources during a time period that is outside of the COT resource (block 1110). For example, the UE (e.g., using communication manager 140 and/or reservation component 1208, depicted in FIG. 12) may reserve a first COT resource of a plurality of COT resources during a time period that is outside of the COT resource, as described above.

As further shown in FIG. 11, in some aspects, process 1100 may include receiving, via a sidelink communication, an indication that another UE has reserved a second COT resource of the plurality of COT resources via one or more slots associated with the first COT resource and using FDM channel access, or that the other UE has transmitted a communication, via the one or more slots associated with the first COT resource, using a different interlace than an interlace that is associated with the first COT resource (block 1120). For example, the UE (e.g., using communication manager 140 and/or reception component 1202, depicted in FIG. 12) may receive, via a sidelink communication, an indication that another UE has reserved a second COT resource of the plurality of COT resources via one or more slots associated with the first COT resource and using FDM channel access, or that the other UE has transmitted a communication, via the one or more slots associated with the first COT resource, using a different interlace than an interlace that is associated with the first COT resource, as described above.

As further shown in FIG. 11, in some aspects, process 1100 may include performing a communication using the first COT resource and based at least in part on avoiding the second COT resource or the different interlace (block 1130). For example, the UE (e.g., using communication manager 140, reception component 1202 and/or transmission component 1204 depicted in FIG. 12) may perform a communication using the first COT resource and based at least in part on avoiding the second COT resource or the different interlace, as described above.

Process 1100 may include additional aspects, such as any single aspect or any combination of aspects described below and/or in connection with one or more other processes described elsewhere herein.

In a first aspect, reserving the first COT resource comprises transmitting an indication of a LBT window, an LBT parameter, and a FDRA parameter associated with the first COT resource.

In a second aspect, alone or in combination with the first aspect, receiving the indication that the other UE has reserved the second COT resource comprises receiving an indication of a LBT window, an LBT parameter, and a FDRA parameter associated with the second COT resource.

In a third aspect, alone or in combination with one or more of the first and second aspects, process 1100 includes transmitting or receiving SCI that includes an indication of a LBT parameter, an LBT window, an interlace, and the second COT resource.

In a fourth aspect, alone or in combination with one or more of the first through third aspects, a time domain resource reservation associated with the SCI indicates a plurality of contiguous COT resources and the LBT window.

In a fifth aspect, alone or in combination with one or more of the first through fourth aspects, an end of the LBT window indicates a location where the UE and the other UE are to complete an LBT procedure and initiate one or more transmissions using the plurality of COT resources.

In a sixth aspect, alone or in combination with one or more of the first through fifth aspects, a start of the LBT window indicates a location where the UE and the other UE are to start performing an LBT procedure based at least in part on the LBT parameter, and an end of the LBT window indicates a last location where the UE and the other UE are to complete the LBT procedure and initiate one or more transmissions using the plurality of COT resources.

In a seventh aspect, alone or in combination with one or more of the first through sixth aspects, a frequency domain resource reservation associated with the SCI indicates one or more reserved interlaces in the COT resource.

In an eighth aspect, alone or in combination with one or more of the first through seventh aspects, the SCI further includes an indication of a cyclic prefix extension starting position or an indication of whether a frequency division multiplexing coordinated channel is allowed.

In a ninth aspect, alone or in combination with one or more of the first through eighth aspects, process 1100 includes transmitting or receiving SCI that indicates a back-off counter value to be used by the other UE for all interlaces associated with the plurality of COT resources.

In a tenth aspect, alone or in combination with one or more of the first through ninth aspects, the SCI includes an indication of a channel access priority class parameter or defer duration.

In an eleventh aspect, alone or in combination with one or more of the first through tenth aspects, process 1100 includes selecting a defer duration based at least in part on a channel access priority class associated with the UE.

Ina twelfth aspect, alone or in combination with one or more of the first through eleventh aspects, process 1100 includes transmitting or receiving sidelink control information that indicates one or more signal backoff counter values per priority class.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
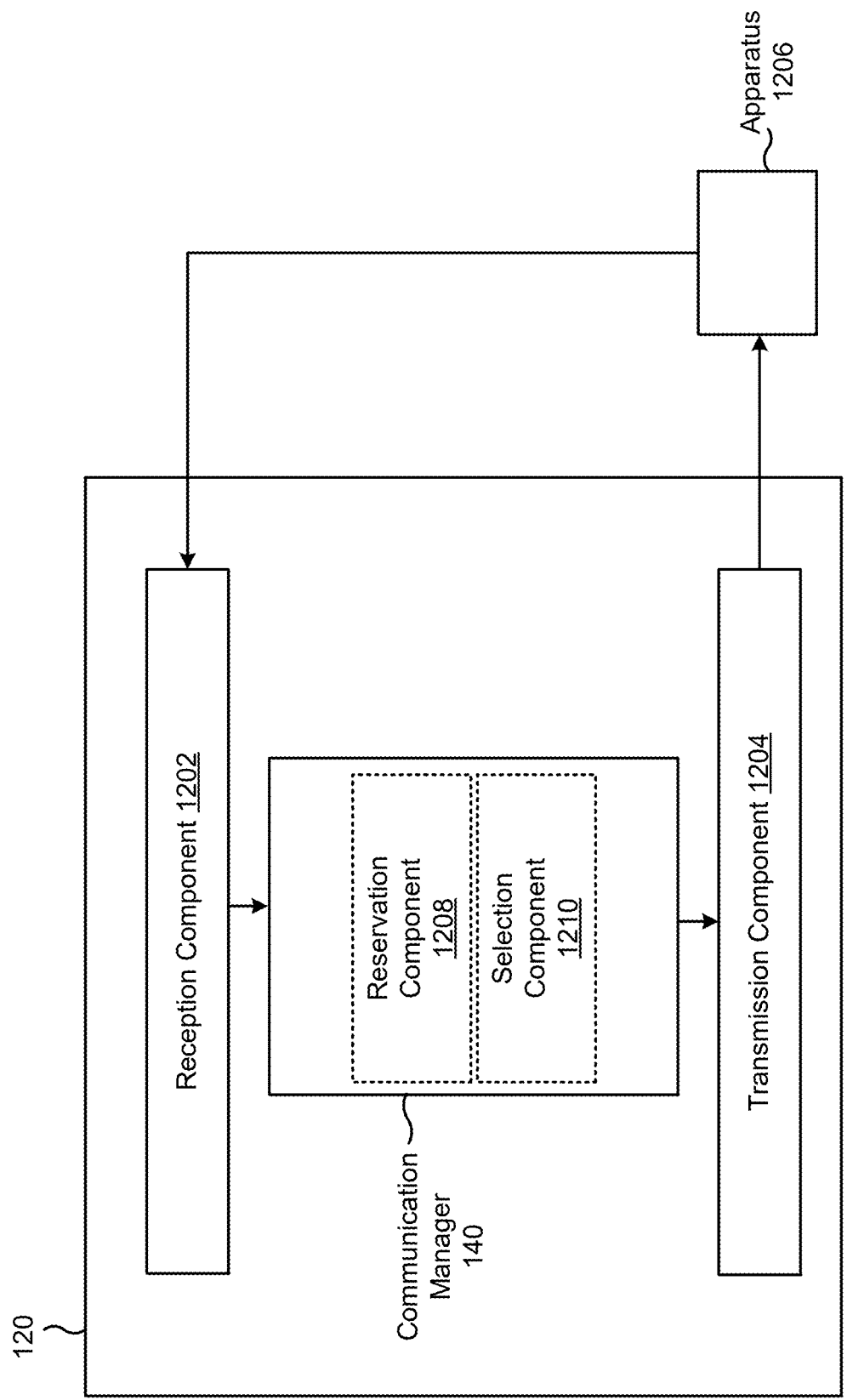
FIG. 12 is a diagram of an example apparatus for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of a reservation component 1208 or a selection component 1210, among other examples.

In some aspects, the apparatus 1200 may be configured to perform one or more operations described herein in connection with FIGS. 7-9. Additionally, or alternatively, the apparatus 1200 may be configured to perform one or more processes described herein, such as process 1000 of FIG. 10, process 1100 of FIG. 11, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive, via a sidelink communication, an indication that another UE has reserved a first COT resource of a plurality of COT resources. The reservation component 1208 may reserve a second COT resource of the plurality of COT resources via one or more slots associated with the first COT resource and using FDM channel access, or transmit a communication, via the one or more slots associated with the first COT resource, using a different interlace than an interlace that is associated with the first COT resource.

The selection component 1210 may select a LBT window, an LBT parameter, and a FDRA parameter prior to reserving the second COT resource or transmitting the communication via the different interlace.

The transmission component 1204 may transmit SCI that includes an indication of a hop counter and an identifier associated with the other UE, wherein reserving the second COT resource or transmitting the communication via the different interlace comprises reserving the second COT resource or transmitting the communication via the different interlace based at least in part on a value of the hop counter failing to satisfy a hop counter threshold.

The transmission component 1204 may transmit or receive SCI that includes an indication of a LBT parameter, an LBT window, an interlace, and the second COT resource. The transmission component 1204 may transmit or receive SCI that indicates a backoff counter value to be used by the other UE for all interlaces associated with the plurality of COT resources.

The selection component 1210 may select a defer duration based at least in part on a channel access priority class associated with the UE. The transmission component 1204 may transmit or receive SCI that indicates one or more signal backoff counter values per priority class.

The selection component 1210 may select the second COT resource using a LBT parameter or an LBT window that is indicated in SCI associated with the plurality of COT resources and based at least in part on an SCI reference signal reserved power (RSRP) being greater than, or greater than or equal to, an SCI RSRP threshold.

The reservation component 1208 may reserve a first COT resource of a plurality of COT resources during a time period that is outside of the COT resource. The reception component 1202 may receive, via a sidelink communication, an indication that another UE has reserved a second COT resource of the plurality of COT resources via one or more slots associated with the first COT resource and using FDM channel access, or that the other UE has transmitted a communication, via the one or more slots associated with the first COT resource, using a different interlace than an interlace that is associated with the first COT resource. The reception component 1202 and/or the transmission component 1204 may perform a communication using the first COT resource and based at least in part on avoiding the second COT resource or the different interlace.

The transmission component 1204 may transmit or receive SCI that includes an indication of a LBT parameter, an LBT window, an interlace, and the second COT resource. The transmission component 1204 may transmit or receive SCI that indicates a backoff counter value to be used by the other UE for all interlaces associated with the plurality of COT resources. The selection component 1210 may select a defer duration based at least in part on a channel access priority class associated with the UE. The transmission component 1204 may transmit or receive sidelink control information that indicates one or more signal backoff counter values per priority class.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, via a sidelink communication, an indication that another UE has reserved a first channel occupancy time (COT) resource of a plurality of COT resources; and reserving a second COT resource of the plurality of COT resources via one or more slots associated with the first COT resource and using frequency division multiplexing (FDM) channel access, or transmitting a communication, via the one or more slots associated with the first COT resource, using a different interlace than an interlace that is associated with the first COT resource.

Aspect 2: The method of Aspect 1, wherein reserving the second COT resource comprises reserving the second COT resource during a time period that is outside of the second COT resource.

Aspect 3: The method of any of Aspects 1-2, wherein reserving the second COT resource comprises aligning a listen-before-talk starting point, a defer duration, and a backup counter to avoid the first COT resource.

Aspect 4: The method of any of Aspects 1-3, wherein reserving the second COT resource comprises aligning a transmission slot and a starting position of a cyclic prefix extension to avoid the first COT resource.

Aspect 5: The method of any of Aspects 1-4, further comprising selecting a listen-before-talk (LBT) window, an LBT parameter, and a frequency domain resource assignment (FDRA) parameter prior to reserving the second COT resource or transmitting the communication via the different interlace.

Aspect 6: The method of Aspect 5, wherein selecting the LBT window, the LBT parameter, and the FDRA parameter comprises aligning a counter value, a defer duration, and a starting position associated with an LBT procedure.

Aspect 7: The method of Aspect 5, wherein selecting the LBT window, the LBT parameter, and the FDRA parameter comprises selecting the LBT window, the LBT parameter, and the FDRA parameter based at least in part on a sidelink control information (SCI) reference signal received power (RSRP) measurement satisfying an SCI RSRP threshold.

Aspect 8: The method of any of Aspects 1-7, further comprising transmitting sidelink control information (SCI) that includes an indication of a hop counter and an identifier associated with the other UE, wherein reserving the second COT resource or transmitting the communication via the different interlace comprises reserving the second COT resource or transmitting the communication via the different interlace based at least in part on a value of the hop counter failing to satisfy a hop counter threshold.

Aspect 9: The method of Aspect 8, wherein reserving the second COT resource further comprises avoiding the first COT resource and one or more other COT resources that are reserved by a group of UEs for coordinated channel access, wherein the group of UEs for coordinated channel access includes the other UE.

Aspect 10: The method of Aspect 9, wherein reserving the second COT resource further comprises reserving the second COT resource based at least in part on the value of the hop counter being greater than, or greater than or equal to, the hop counter threshold, and based at least in part on the UE being included in the group of UEs for coordinated channel access.

Aspect 11: The method of any of Aspects 1-10, further comprising transmitting or receiving sidelink control information (SCI) that includes an indication of a listen-before-talk (LBT) parameter, an LBT window, an interlace, and the second COT resource.

Aspect 12: The method of Aspect 11, wherein a time domain resource reservation associated with the SCI indicates a plurality of contiguous COT resources and the LBT window.

Aspect 13: The method of Aspect 12, wherein an end of the LBT window indicates a location where the UE and the other UE are to complete an LBT procedure and initiate one or more transmissions using the plurality of COT resources.

Aspect 14: The method of Aspect 12, wherein a start of the LBT window indicates a location where the UE and the other UE are to start performing an LBT procedure based at least in part on the LBT parameter, and an end of the LBT window indicates a last location where the UE and the other UE are to complete the LBT procedure and initiate one or more transmissions using the plurality of COT resources.

Aspect 15: The method of Aspect 11, wherein a frequency domain resource reservation associated with the SCI indicates one or more reserved interlaces in the second COT resource.

Aspect 16: The method of Aspect 11, wherein the SCI further includes an indication of a cyclic prefix extension starting position or an indication of whether a frequency division multiplexing coordinated channel is allowed.

Aspect 17: The method of any of Aspects 1-16, further comprising transmitting or receiving sidelink control information (SCI) that indicates a backoff counter value to be used by the other UE for all interlaces associated with the plurality of COT resources.

Aspect 18: The method of Aspect 17, wherein the SCI includes an indication of a channel access priority class parameter or defer duration.

Aspect 19: The method of Aspect 17, further comprising selecting a defer duration based at least in part on a channel access priority class associated with the UE.

Aspect 20: The method of any of Aspects 1-19, further comprising transmitting or receiving sidelink control information (SCI) that indicates one or more signal backoff counter values per priority class.

Aspect 21: The method of any of Aspects 1-20, further comprising selecting the second COT resource using a listen-before-talk (LBT) parameter or an LBT window that is indicated in sidelink control information (SCI) associated with the plurality of COT resources and based at least in part on an SCI reference signal reserved power (RSRP) being greater than, or greater than or equal to, an SCI RSRP threshold.

Aspect 22: A method of wireless communication performed by a user equipment (UE), comprising: reserving a first channel occupancy time (COT) resource of a plurality of COT resources during a time period that is outside of the COT resource; receiving, via a sidelink communication, an indication that another UE has reserved a second COT resource of the plurality of COT resources via one or more slots associated with the first COT resource and using frequency division multiplexing (FDM) channel access, or that the other UE has transmitted a communication, via the one or more slots associated with the first COT resource, using a different interlace than an interlace that is associated with the first COT resource; and performing a communication using the first COT resource and based at least in part on avoiding the second COT resource or the different interlace.

Aspect 23: The method of Aspect 22, wherein reserving the first COT resource comprises transmitting an indication of a listen-before-talk (LBT) window, an LBT parameter, and a frequency domain resource assignment (FDRA) parameter associated with the first COT resource.

Aspect 24: The method of any of Aspects 22-23, wherein receiving the indication that the other UE has reserved the second COT resource comprises receiving an indication of a listen-before-talk (LBT) window, an LBT parameter, and a frequency domain resource assignment (FDRA) parameter associated with the second COT resource.

Aspect 25: The method of any of Aspects 22-24, wherein receiving the indication that the other UE has reserved the second COT resource or transmitted the communication via the different interlace comprises receiving an indication of a hop counter and an identifier associated with the UE.

Aspect 26: The method of any of Aspects 22-25, further comprising transmitting or receiving sidelink control information (SCI) that includes an indication of a listen-before-talk (LBT) parameter, an LBT window, an interlace, and the second COT resource.

Aspect 27: The method of Aspect 26, wherein a time domain resource reservation associated with the SCI indicates a plurality of contiguous COT resources and the LBT window.

Aspect 28: The method of Aspect 27, wherein an end of the LBT window indicates a location where the UE and the other UE are to complete an LBT procedure and initiate one or more transmissions using the plurality of COT resources.

Aspect 29: The method of Aspect 27, wherein a start of the LBT window indicates a location where the UE and the other UE are to start performing an LBT procedure based at least in part on the LBT parameter, and an end of the LBT window indicates a last location where the UE and the other UE are to complete the LBT procedure and initiate one or more transmissions using the plurality of COT resources.

Aspect 30: The method of Aspect 26, wherein a frequency domain resource reservation associated with the SCI indicates one or more reserved interlaces in the COT resource.

Aspect 31: The method of Aspect 26, wherein the SCI further includes an indication of a cyclic prefix extension starting position or an indication of whether a frequency division multiplexing coordinated channel is allowed.

Aspect 32: The method of any of Aspects 22-31, further comprising transmitting or receiving sidelink control information (SCI) that indicates a backoff counter value to be used by the other UE for all interlaces associated with the plurality of COT resources.

Aspect 33: The method of Aspect 32, wherein the SCI includes an indication of a channel access priority class parameter or defer duration.

Aspect 34: The method of Aspect 32, further comprising selecting a defer duration based at least in part on a channel access priority class associated with the UE.

Aspect 35: The method of any of Aspects 22-34, further comprising transmitting or receiving sidelink control information that indicates one or more signal backoff counter values per priority class.

Aspect 36: An apparatus for wireless communication at a device, comprising a processor; memory coupled with the processor; and instructions stored in the memory and executable by the processor to cause the apparatus to perform the method of one or more of Aspects 1-21.

Aspect 37: A device for wireless communication, comprising a memory and one or more processors coupled to the memory, the one or more processors configured to perform the method of one or more of Aspects 1-21.

Aspect 38: An apparatus for wireless communication, comprising at least one means for performing the method of one or more of Aspects 1-21.

Aspect 39: A non-transitory computer-readable medium storing code for wireless communication, the code comprising instructions executable by a processor to perform the method of one or more of Aspects 1-21.

Aspect 40: A non-transitory computer-readable medium storing a set of instructions for wireless communication, the set of instructions comprising one or more instructions that, when executed by one or more processors of a device, cause the device to perform the method of one or more of Aspects 1-21.

Aspect 41: An apparatus for wireless communication at a device, comprising a processor; memory coupled with the processor; and instructions stored in the memory and executable by the processor to cause the apparatus to perform the method of one or more of Aspects 22-35.

Aspect 42: A device for wireless communication, comprising a memory and one or more processors coupled to the memory, the one or more processors configured to perform the method of one or more of Aspects 22-35.

Aspect 43: An apparatus for wireless communication, comprising at least one means for performing the method of one or more of Aspects 22-35.

Aspect 44: A non-transitory computer-readable medium storing code for wireless communication, the code comprising instructions executable by a processor to perform the method of one or more of Aspects 22-35.

Aspect 45: A non-transitory computer-readable medium storing a set of instructions for wireless communication, the set of instructions comprising one or more instructions that, when executed by one or more processors of a device, cause the device to perform the method of one or more of Aspects 22-35.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
receive, via a sidelink communication, an indication that another UE has reserved a first channel occupancy time (COT) resource, of a plurality of COT resources, based at least in part on receiving an indication of a listen-before-talk (LBT) window and a frequency domain resource assignment (FDRA) parameter associated with the first COT resource;
reserve a second COT resource of the plurality of COT resources via one or more slots associated with the first COT resource and using frequency division multiplexing (FDM) channel access;

select another LBT window, a plurality of LBT parameters, and another FDRA parameter prior to reserving the second COT resource or prior to transmitting a communication via a different interlace than an interlace that is associated with the first COT resource, wherein the plurality of LBT parameters are aligned to avoid first COT resource; and transmit the communication, via the one or more slots associated with the second COT resource.

2. The apparatus of claim 1,
wherein the one or more processors, to reserve the second COT resource, are configured to align an LBT starting point, a defer duration, and a backup counter.

3. The apparatus of claim 1,
wherein the one or more processors, to reserve the second COT resource, are configured to align a transmission slot and a starting position of a cyclic prefix extension.

4. The apparatus of claim 1,
wherein the plurality of LBT parameters include a counter value, a defer duration, and a starting position associated with an LBT procedure.

5. The apparatus of claim 1,
wherein the one or more processors, to select the other LBT window, the plurality of LBT parameters, and the other FDRA parameter, are configured to select the other LBT window, the plurality of LBT parameters, and the other FDRA parameter based at least in part on a sidelink control information (SCI) reference signal received power (RSRP) measurement satisfying an SCI RSRP threshold.

6. The apparatus of claim 1,
wherein the one or more processors are further configured to transmit sidelink control information (SCI) that includes an indication of a hop counter and an identifier associated with the other UE, wherein reserving the second COT resource or transmitting the communication via the different interlace comprises reserving the second COT resource or transmitting the communication via the different interlace based at least in part on a value of the hop counter failing to satisfy a hop counter threshold.

7. The apparatus of claim 6,
wherein reserving the second COT resource further comprises avoiding the first COT resource and one or more other COT resources that are reserved by a group of UEs for coordinated channel access, wherein the group of UEs for coordinated channel access includes the other UE.

8. The apparatus of claim 7,
wherein the one or more processors, to reserve the second COT resource, are configured to reserve the second COT resource based at least in part on the value of the hop counter being greater than, or greater than or equal to, the hop counter threshold, and based at least in part on the UE being included in the group of UEs for coordinated channel access.

9. The apparatus of claim 1,
wherein the one or more processors are further configured to transmit or receive sidelink control information (SCI) that includes an indication of the plurality of LBT parameters, the other LBT window, an interlace, and the second COT resource.

10. The apparatus of claim 9,
wherein a frequency domain resource reservation associated with the SCI indicates one or more reserved interlaces in the second COT resource.

11. The apparatus of claim 9,
wherein the SCI further includes an indication of a cyclic prefix extension starting position or an indication of whether a frequency division multiplexing coordinated channel is allowed.

12. The apparatus of claim 1,
wherein the one or more processors are further configured to transmit or receive sidelink control information (SCI) that indicates a backoff counter value to be used by the other UE for all interlaces associated with the plurality of COT resources.

13. The apparatus of claim 12,
wherein the one or more processors are further configured to select a defer duration based at least in part on a channel access priority class associated with the UE.

14. The apparatus of claim 1,
wherein the one or more processors are further configured to transmit or receive sidelink control information that indicates one or more signal backoff counter values per priority class.

15. The apparatus of claim 1,
wherein the one or more processors are further configured to select the second COT resource using the plurality of LBT parameters or the other LBT window that is indicated in sidelink control information (SCI) associated with the plurality of COT resources and based at least in part on an SCI reference signal reserved power (RSRP) being greater than, or greater than or equal to, an SCI RSRP threshold.

16. An apparatus for wireless communication at a user equipment (UE), comprising:
one or more memories; and
one or more processors, coupled to the one or more memories, configured to:
reserve a first channel occupancy time (COT) resource of a plurality of COT resources during a time period that is outside of the COT resource based at least in part on transmitting an indication of a listen-before-talk (LBT) window and a frequency domain resource assignment (FDRA) parameter associated with the first COT resource;
receive, via a sidelink communication, an indication that:
another UE has reserved a second COT resource of the plurality of COT resources via one or more slots associated with the first COT resource and using frequency division multiplexing (FDM) channel access,
the other UE has selected another LBT window, a plurality of LBT parameters, and another FDRA parameter prior to reserving the second COT resource or prior to transmitting a communication via a different interlace than an interlace that is associated with the first COT resource, wherein the plurality of LBT parameters are aligned to avoid first COT resource, and
the other UE has transmitted the communication, via the one or more slots associated with the first COT resource; and
perform another communication using the first COT resource and based at least in part on avoiding the second COT resource or the different interlace.

17. The apparatus of claim 16,
wherein the one or more processors, to reserve the first COT resource, are configured to transmit an indication of an LBT parameter associated with the first COT resource.

18. The apparatus of claim 16,
wherein the one or more processors are further configured to transmit or receive sidelink control information (SCI) that includes an indication of the plurality of LBT parameters, the other LBT window, an interlace, and the second COT resource.

19. The apparatus of claim 18,
wherein a time domain resource reservation associated with the SCI indicates a plurality of contiguous COT resources and the LBT window.

20. The apparatus of claim 18,
wherein a frequency domain resource reservation associated with the SCI indicates one or more reserved interlaces in the COT resource.

21. The apparatus of claim 18,
wherein the SCI further includes an indication of a cyclic prefix extension starting position or an indication of whether a frequency division multiplexing coordinated channel is allowed.

22. The apparatus of claim 16,
wherein the one or more processors are further configured to transmit or receive sidelink control information (SCI) that indicates a backoff counter value to be used by the other UE for all interlaces associated with the plurality of COT resources.

23. The apparatus of claim 16,
wherein the one or more processors are further configured to transmit or receive sidelink control information that indicates one or more signal backoff counter values per priority class.

24. A method of wireless communication performed by a user equipment (UE), comprising:
receiving, via a sidelink communication, an indication that another UE has reserved a first channel occupancy time (COT) resource, of a plurality of COT resources, based at least in part on receiving an indication of a listen-before-talk (LBT) window and a frequency domain resource assignment (FDRA) parameter associated with the first COT resource;
reserving a second COT resource of the plurality of COT resources via one or more slots associated with the first COT resource and using frequency division multiplexing (FDM) channel access;
selecting another LBT window, a plurality of LBT parameters, and another FDRA parameter prior to reserving the second COT resource or prior to transmitting a communication via a different interlace than an interlace that is associated with the first COT resource, wherein the plurality of LBT parameters are aligned to avoid first COT resource; and
transmitting the communication, via the one or more slots associated with the first second COT resource.

25. The method of claim 24,
wherein reserving the second COT resource comprises aligning an LBT starting point, a defer duration, and a backup counter.

26. The method of claim 24,
wherein reserving the second COT resource comprises aligning a transmission slot and a starting position of a cyclic prefix extension.

27. The method of claim 24,
wherein selecting the other LBT window, the plurality of LBT parameters, and the other FDRA parameter comprises selecting the other LBT window, the plurality of LBT parameters, and the other FDRA parameter based at least in part on a sidelink control information (SCI) reference signal received power (RSRP) measurement satisfying an SCI RSRP threshold.

28. The method of claim 24, further comprising:
transmitting sidelink control information (SCI) that includes an indication of a hop counter and an identifier associated with the other UE, and wherein reserving the second COT resource or transmitting the communication via the different interlace comprises reserving the second COT resource or transmitting the communication via the different interlace based at least in part on a value of the hop counter failing to satisfy a hop counter threshold.

29. A method of wireless communication performed by a user equipment (UE), comprising:
reserving a first channel occupancy time (COT) resource of a plurality of COT resources during a time period that is outside of the COT resource based at least in part on transmitting an indication of a listen-before-talk (LBT) window and a frequency domain resource assignment (FDRA) parameter associated with the first COT resource;
receiving, via a sidelink communication, an indication that:
another UE has reserved a second COT resource of the plurality of COT resources via one or more slots associated with the first COT resource and using frequency division multiplexing (FDM) channel access,
the other UE has selected another LBT window, a plurality of LBT parameters, and another FDRA parameter prior to reserving the second COT resource or prior to transmitting a communication via a different interlace than an interlace that is associated with the first COT resource, wherein the plurality of LBT parameters are aligned to avoid first COT resource, and
the other UE has transmitted the communication, via the one or more slots associated with the first COT resource; and
performing another communication using the first COT resource and based at least in part on avoiding the second COT resource or the different interlace.

30. The method of claim 29,
wherein reserving the first COT resource comprises transmitting an indication of an LBT parameter associated with the first COT resource.

* * * * *